(12) United States Patent
Hubackova et al.

(10) Patent No.: US 11,014,949 B2
(45) Date of Patent: May 25, 2021

(54) COMPOUNDS FOR TREATMENT OF SENESCENCE-RELATED DISORDERS

(71) Applicants: SPRINGTIDE VENTURES S.R.O., Prague (CZ); SMART BRAIN S.R.O., Prague (CZ); BIOTECHNOLOGICKY USTAV AV CR, V.V.I., Vestec (CZ); MITOTAX S.R.O., Prague (CZ)

(72) Inventors: Sona Hubackova, Prague (CZ); Lukas Werner, Velke Popovice (CZ); Jan Stursa, Prague (CZ); Jiri Neuzil, Prague (CZ)

(73) Assignees: SPRINGTIDE VENTURES S.R.O., Prague (CZ); SMART BRAIN S.R.O., Prague (CZ); BIOTECHNOLOGY USTAV AV CR, V.V.I., Vestec (CZ); MITOTAX S.R.O., Prague (CZ)

( * ) Notice: Subject to any disclaimer, the term of this patent is extended or adjusted under 35 U.S.C. 154(b) by 0 days.

(21) Appl. No.: 16/465,882

(22) PCT Filed: Nov. 15, 2017

(86) PCT No.: PCT/EP2017/079362
§ 371 (c)(1),
(2) Date: May 31, 2019

(87) PCT Pub. No.: WO2018/099723
PCT Pub. Date: Jun. 7, 2018

(65) Prior Publication Data
US 2020/0079805 A1    Mar. 12, 2020

(30) Foreign Application Priority Data
Dec. 1, 2016 (EP) ...................... 16201594

(51) Int. Cl.
*C07F 9/54* (2006.01)
(52) U.S. Cl.
CPC .......... *C07F 9/5442* (2013.01); *C07F 9/5428* (2013.01); *C07F 9/5456* (2013.01)
(58) Field of Classification Search
CPC .................................................. C07F 9/5442
See application file for complete search history.

(56) References Cited

U.S. PATENT DOCUMENTS

| 9,896,466 B2 * | 2/2018 | Neuzil ................. C09B 69/008 |
| 2015/0151001 A1 | 6/2015 | Squires |

FOREIGN PATENT DOCUMENTS

WO   2014/173374 A1   10/2014

OTHER PUBLICATIONS

Baker, et al., "Naturally occurring p16(Ink4a)-positive cells shorten healthy lifespan", Nature, 530 (7589), pp. 184-189 (2016).

Vasto, et al., "Inflammatory networks in ageing, age-related diseases and longevity", Mechanisms of Ageing and Development, 128, pp. 83-91 (2007).
Campisi, et al., "Senescent Cells, Tumor Suppression, and Organismal Aging: Good Citizens, Bad Neighbors", Cell, 120, pp. 513-522 (2005).
Palmer, et al., "Cellular Senescence in Type 2 Diabetes: A Therapeutic Opportunity", Diabetes, 64, pp. 2289-2298 (2015).
Baker, et al., "Clearance of p16(Ink4a)-positive senescent cells delays ageing-associated disorders", Nature, 479 (7372), pp. 232-236 (2012).
Yosef, et al., "Directed elimination of senescent cells by inhibition of BCL-W and BCL-XL", Nat Commun. 7: 11190 (2016).
Munoz-Espin, et al., "Cellular senescence: from physiology to pathology", Nature Reviews Molecular Cell Biology, 15, pp. 482-496 (2014).
Castro, et al., "Cellular Senescence in the Pathogenesis of Benign Prostatic Hyperplasia", The Prostate, 55, pp. 30-38 (2003).
Tessier, et al., "(Z)-Tamoxifen and Tetrasubstituted Alkenes and Dienes via a Regio- and Stereospecific Three-Component Magnesium Carbometalation Palladium(0) Cross-Coupling Strategy", Organic Letters, 5(17), pp. 2989-2992 (2003).
C. DeSantis et al., "Breast Cancer Statistics, 2011", CA Cancer J. Clin., vol. 61, No. 6, pp. 409-418 (2011).
Y. Ding et al., "Receptor Tyrosine Kinase ErbB2 Translocates into Mitochondria and Regulates Cellular Metabolism", Nature Communications, vol. 3, pp. 1-12 (2012).
L-F Dong et al., "Alpha-Tocopheryl Succinate Induces Apoptosis by Targeting Ubiquinone-Binding Sites in Mitochondrial Respiratory Complex II", Oncogene, vol. 27, pp. 4324-4335 (2008).
L-F Dong et al., "Mitochondrial Targeting of Alpha-Tocopheryl Succinate Enhances its Pro-Apoptotic Efficacy: A New Paradigm for Effective Cancer Therapy", Free Radical Biol. & Med., vol. 50, pp. 1546-1555 (2011).
L-F. Dong et al., "Suppression of Tumor Growth In Vivo by the Mitocan Alpha-Tocopheryl Succinate Requires Respiratory Complex II", Clin. Cancer Res., vol. 15, No. 5, pp. 1593-1642 (2009).

(Continued)

*Primary Examiner* — Golam M Shameem
(74) *Attorney, Agent, or Firm* — Venable LLP

(57) ABSTRACT

The present invention relates to compounds of general formula (I) in particular for use in the treatment of senescence-related diseases, such as idiopathic pulmonary fibrosis, sarcopenia, diabetes, obesity, osteoarthritis, chronic inflammations, glaucoma, cataracts, radiation-induced oral mucosis, renal transplantation, prostatic hyperplasia.

10 Claims, No Drawings

(56) References Cited

OTHER PUBLICATIONS

L-F. Dong et al., "Mitochondrial Targeting of Vitamin E Succinate Enhances its Pro-Apoptotic and Anti-Cancer Activity via Mitochondrial Complex II", J. Biol. Chem., vol. 286, No. 5, pp. 3717-3728 (2011).
M. S. Ewer et al., "Cardiotoxicity of Anticancer Treatments: What the Cardiologist Needs to Know," Nature Reviews, vol. 7, pp. 564-575 (2010).
E. R. Ahn et al., "Is the Improved Efficacy of Trastuzumab and Lapatinib Combination Worth the Added Toxicity? A Discussion of Current Evidence, Recommendations, and Ethical Issues Regarding Dual HER2-Targeted Therapy," Breast Cancer: Basic and Clinical Reserach, vol. 6, pp. 191-207 (2012).
M. Gerlinger et al., "Intratumor Heterogeneity and Branched Evolution Revealed by Multiregion Sequencing," N. Engl. J. Med., vol. 366, No. 10, pp. 883-892 (2012).
C. T. Guy et al., "Expression of the Neu Protooncogene in the Mammary Epithelium of Transgenic Mice Induces Metastatic Disease," Proc. Natl. Acad. Sci., vol. 89, pp. 10578-10582 (1992).
D. Hanahan et al., "Hallmarks of Cancer: the Next Generation", Cell, vol. 144, pp. 646-674 (2011).
D. Hanahan et al., "The Hallmarks of Cancer", Cell, vol. 100, pp. 57-70 (2000).
H-Y. Yang et al., "p27 Kip1 Inhibits HER2/new-mediated Cell Growth and tumorigenesis", Oncogene, vol. 20, pp. 3695-3702 (2001).
S. Jones et al., Core Signaling Pathways in Human Pancreatic Cancers Revealed by Global Genomic Analyses, Science, vol. 321, pp. 1801-1806 (2008).
K. Kluckova et al., "Mitochondrial complex II, a Novel Target for Anti-Cancer Agents", Biochimica et Biophysica Acta, vol. 1827, pp. 552-564 (2013).
C. Thomas et al., "The Different Roles of ER Subtypes in Cancer Biology and Therapy", Nature Reviews, vol. 11, pp. 597-608 (2011).
J. Neuzil et al., "Classification of Mitocans, Anti-Cancer Drugs Acting on Mitochondria", Mitochondrion, vol. 13, pp. 199-208 (2013).
D. W. Parsons et al., "An Integrated Genomic Analysis of Human Glioblastoma Multiforme", Science, vol. 321, pp. 1807-1812 (2008).
J. Rohlena et al., "Mitochondrially Targeted Alpha-Tocopheryl Succinate Is Antiangiogenic: Potential Benefit Against Tumor Angiogenesis but Caution Against Wound Healing", Antioxidants & Redox Signaling, vol. 15, No. 12, pp. 2923-2935 (2011).
J. Stingl et al., "Molecular Heterogeneity of Breast Carcinomas and the Cancer Stem Cell Hypothesis", Nature Reviews, vol. 7, pp. 791-799 (2007).
G. Deblois et al., Oestrogen-Related Receptors in Breast Cancer: Control of Cellular Metabolism and Beyond, Nature Reviews, vol. 13, pp. 27-36 (2013).
C. L. Arteaga et al., "Treatment of HER2-Positive Breast Cancer: Current Status and Future Perspectives", Nature Reviews, vol. 9, pp. 16-32 (2012).
S-X Lin et al., "Molecular Therapy of Breast Cancer: Progress and Future Directions", Nature Reviews, vol. 6, pp. 485-493 (2010).
D. Wetterskog et al., "Identification of Novel Determinants of Resistance to Lapatinib in ERBB2-Amplified Cancers", Oncogene, vol. 33, pp. 966-976 (2014).
P.I. Moreira et al., "Tamoxifen and Estradiol Interact with the Flavin Mononucleotide Site of Complex I Leading to Mitochondrial Failure", The Journal of Biological Chemistry, vol. 281, No. 15, pp. 10143-10152 (2006).
J. Neuzil et al., "Molecular mechanism of 'mitocan'-induced apoptosis in cancer cells epitomizes the multiple roles of reactive oxygen species and Bcl-2 family proteins", FEBS Letters, vol. 580, pp. 5125-5129 (2006).
L. Biasutto et al., "Mitochondrially targeted anti-cancer agents", Mitochondrion, vol. 10, pp. 670-681 (2010).
C. Saal et al., "Pharmaceutical salts: A summary on doses of salt formers from the Orange Book", European Journal of Pharmaceutical Sciences, vol. 49, pp. 614-623 (2013).
R.A.J. Smith et al., "Delivery of bioactive molecules to mitochondria in vivo", PNAS, vol. 100, No. 9, pp. 5407-5412 (2003).
S. Parvez et al., "Taurine Prevents Tamoxifen-Induced Mitochondrial Oxidative Damage in Mice", Basic & Clinical Pharmacology & Toxicology, vol. 102, pp. 382-387 (2008).
K. Rohlenova et al., "Selective Disruption of Respiratory Supercomplexes as a New Strategy to Suppress Her2(high) Breast Cancer", Antioxidants & Redox Signaling, vol. 26, No. 2, pp. 84-103 (2017).
S. Hubackova et al., "Selective elimination of senescent cells by mitochondrial targeting is regulated by ANT2", Cell Death & Differentiation, vol. 26, pp. 276-290 (2019).

* cited by examiner

COMPOUNDS FOR TREATMENT OF SENESCENCE-RELATED DISORDERS

FIELD OF ART

The invention relates to novel compounds capable of eliminating senescent cells from living organisms and useful in the treatment of senescence-related disorders.

BACKGROUND ART

Cellular senescence is suggested to be a first line tumorigenesis barrier preventing division of cells with damaged genomes. On the other hand, the persistence of senescent cells in organism is thought to be deleterious due to substances produced by these cells themselves. Half century after Leonard Hayflick's proposition, recent publications unequivocally documented the contribution of senescent cells to organism aging (Baker et al., Naturally occurring p16(Ink4a)-positive cells shorten healthy lifespan. Nature. 2016 530: 184-189). Given the fact that senescent cell cycle arrest is not fully irreversible, the persistence of senescent cells in tissues might represent a time-dependent threat of senescence bypass and transition of senescent cell escapers with irreparable DNA damage into cells with pathological potential.

Changes in gene expression characteristics for various forms of senescence are accompanied by a robust increase in mRNA levels and secretion of numerous cytokines, chemokines, growth factors and proteases. This phenomenon was termed senescence-associated secretory phenotype (SASP). As the SASP results primarily from genomic damage response, one of its beneficial functions might be to communicate with cells of the immune system through secretion of pro-inflammatory cytokines, especially TNFα, IL6, IL8 and IL1β, to signal the presence of damaged cell bearing potential risk of pathological development. Apart from this function, the role of SASP was found also in tissue regeneration after damage. Matrix metalloproteinases secreted by senescent cells in damaged tissue protect accumulation of collagen and fibronectin, two proteins participating in the expansion of fibrosis.

On the other hand, accumulation of senescent cells in old people or patients with immunosuppresive chemotherapy, where immune system is attenuated, led to inhibition of various organ functions in an age-dependent manner (Vasto et al., Inflammatory networks in ageing, age-related diseases and longevity. Mech Ageing Dev. 2007 128: 83-91) or to tissue damage due to increased signalling of pro-inflammatory cytokines by enhancement of oxidative stress due to aberrant mitochondria in neighbouring cells (Campisi et al., Senescent cells, tumor suppression, and organismal aging: good citizens, bad neighbors. Cell. 2005 120: 513-522). It was described that senescent cells play a role in type 2 diabetes pathogenesis through direct impact on pancreatic beta cell function, SASP-mediated tissue damage and involvement in adipose tissue dysfunction (for overview see Palmer et al., Cellular Senescence in Type 2 Diabetes: A Therapeutic Opportunity. Diabetes. 2015 64: 2289-2298). Since, in turn, metabolic and signalling changes seen in diabetes can promote senescence, it is obvious that senescent cells are part of the pathogenic loop in diabetes, being both the cause and consequence of metabolic changes and tissue damage, and their therapeutic targeting may have a large impact on preventing the progression of the disease. It was also found that SASP amplify senescent phenotype by autocrine or paracrine manner, resulting in spreading of senescence through tissues and organs.

Until now, only two groups reported on elimination of senescent cells and its consequence. First, Baker et al (Baker et al., Clearance of p16Ink4a-positive senescent cells delays ageing-associated disorders. Nature. 2011 479: 232-236) used specific transgenic mice carrying the caspase 8 plasmid under the p16 promotor, which activates apoptosis when cells undergo senescence, thereby eliminating these cells in the organism. They demonstrated role of senescent cell elimination in the improvement of life quality and prolonged life span.

Senescent cells upregulate proteins from the Bcl-2 family to protect themselves from apoptosis. Yosef et al. (Yosef et al., Directed elimination of senescent cells by inhibition of BCL-W and BCL-XL. Nat Commun. 7: 11190) showed for the first time that senescent cells can be eliminated pharmacologically using the Bcl-2 inhibitor ABT-737, which was not subjected to clinical testing due to its unfavourable pharmacologic properties.

The ability to pharmacologically eliminate senescent cells in vivo opens the door to study the roles of senescent cells in a wide range of physiological settings in which they are detected. The chemotherapeutic elimination of senescent cells may prove beneficial, since accumulation of such cells in various tissues contributes to age-related pathologies.

Clearance of senescent cells from organism therefore plays a role in treatment and/or prevention of senescence-related diseases, such as idiopathic pulmonary fibrosis, sarcopenia, diabetes, obesity, osteoarthritis, chronic inflammations, glaucoma, cataracts, radiation-induced oral mucosis, renal transplantation (Munoz-Espin and Serrano, Cellular senescence: from physiology to pathology. Nat Rev Mol Cell Biol. 2014, 15: 482-496) and prostatic hyperplasia (Castro et al., Cellular senescence in the pathogenesis of benign prostatic hyperplasia. Prostate, 55, 30-8. (2003)).

DISCLOSURE OF THE INVENTION

The present invention provides a new generation of substances of general formula I, which shall be considered to include all isomeric structures (and wherein the crossed double bond in the general formula I indicates that the double bond may have E and/or Z configuration) and pharmaceutically acceptable salts,

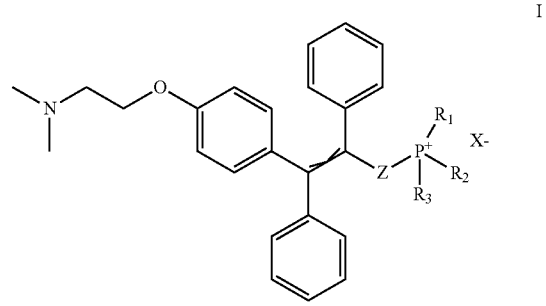

I wherein Z is a linear hydrocarbyl chain selected from alkylene, alkenylene or alkynylene, containing 1 to 20 carbon atoms, preferably 4 to 14 carbon atoms, more preferably 8 to 12 carbon atoms, whereas optionally one or more carbon atom pairs in the hydrocarbyl chain may be replaced by one or more 5-membered or 6-membered aromatic rings or heteroaromatic rings containing the heteroatoms O, S and/or N, preferably phenylenes or pyridylenes or triazoles, and/or one or more carbon atoms in the hydrocarbyl chain may be replaced by one or more heteroatoms selected from O, S, NH; and whereas the hydrocarbyl chain can be unsubstituted or substituted by one or more substituents selected independently from the group comprising C1-C4 alkyl; N(H or C1-C4 alkyl)$_2$, wherein the alkyls are the same or different; phenyl; benzyl; OH; =O; SH; =S; F; Cl; Br; I; C1-C4 alkoxy; C1-C4 acyloxy; C1-C4 mercapto;

and each of R1, R2, R3 is independently selected from the group comprising C1-C10 alkyl, C6-C12 aryl, C6-C12-aryl-C1-C2-alkyl, C5-C12 heteroaryl, C3-C8 cycloalkyl, wherein each of R1, R2, R3 can optionally (and independently from others) be substituted by one or more substituents selected independently from the group comprising C1-C4 alkyl; C1-C4 alkoxy; N(H or C1-C4 alkyl)$_2$, wherein the alkyls are the same or different; OH; =O; SH; =S; F; Cl; Br; I; C1-C4 mercapto.

Preferably, Z is a linear hydrocarbyl chain selected from alkylene, alkenylene or alkynylene (preferably alkylene), containing 4 to 14 carbon atoms, more preferably 8 to 12 carbon atoms, most preferably, 8 or 10 or 12 carbon atoms.

Preferably, Z is a linear hydrocarbyl chain selected from alkylene, alkenylene or alkynylene (preferably alkylene), containing 4 to 14 carbon atoms, more preferably 8 to 12 carbon atoms, wherein one or more carbon atoms in the hydrocarbyl chain are replaced by one or more heteroatoms selected from O, S, NH (preferably O).

Preferably, Z is a linear hydrocarbyl chain selected from alkylene, alkenylene or alkynylene (preferably alkylene), containing 4 to 14 carbon atoms, more preferably 8 to 12 carbon atoms, wherein one or more carbon atoms in the hydrocarbyl chain are substituted by one or more substituents selected from C1-C4 alkyl; N(H or C1-C4 alkyl)$_2$, wherein the alkyls are the same or different; OH; =O; SH; =S; F; Cl; Br; I; C1-C4 alkoxy; C1-C4 mercapto.

Preferably, Z is a linear hydrocarbyl chain selected from alkylene, alkenylene or alkynylene (preferably alkylene), containing 4 to 14 carbon atoms, more preferably 8 to 12 carbon atoms, wherein one or more carbon atoms in the hydrocarbyl chain are replaced by one or more heteroatoms selected from O, S, NH (preferably N), and one or more carbon atoms in the hydrocarbyl chain are substituted by one or more substituents selected from OH; =O; SH; =S; C1-C4 alkoxy; C1-C4 mercapto.

Preferably, Z is a linear hydrocarbyl chain selected from alkylene, alkenylene or alkynylene (preferably alkylene), containing 4 to 14 carbon atoms, more preferably 8 to 12 carbon atoms, wherein one or more carbon atom pairs in the hydrocarbyl chain are replaced by one or more 5-membered or 6-membered aromatic rings or heteroaromatic rings, preferably phenylenes and/or pyridylenes and/or triazoles.

Preferably, Z is substituted by one or more substituents selected from C1-C4 alkyl; N(H or C1-C4 alkyl)$_2$, wherein the alkyls are the same or different; OH; =O; SH; =S; F; Cl; Br; I; C1-C4 alkoxy; C1-C4 mercapto; more preferably, Z is substituted by one or more substituents selected from OH; =O; SH; =S; F; Cl; Br; I.

For the protection of the compounds as such, R1, R2 and R3 are not simultaneously unsubstituted phenyls.

Preferably, each of R1, R2, R3 is independently selected from the group comprising methyl, butyl, octyl, phenyl, metoxyphenyl, benzyl, cyclohexyl, tert-butyl.

X$^-$ is a pharmaceutically acceptable anion, in particular anion of inorganic or organic acid, particularly suitable anions are selected from the group of organic salts, such as citrate, acetate, lactate, tartarate, oxalate, ascorbate, mesylate, tosylate, or inorganic salts, such as sulphate, halogenide, phosphate and/or their mixtures.

The herein above listed embodiments can be freely combined.

The compounds of the invention are prepared by following synthetic procedures.

A preferred method of preparation of 2-(4-(1,2-diphenylvinyl)phenoxy)-N,N-dimethylethan-1-amine derivatives of the general formula I, particularly suitable when Z is alkylene, is based on a reaction of ylide generated from tert-butyldimethylsilyl-oxy-alkyl-triphenylphosphonium with the general formula II,

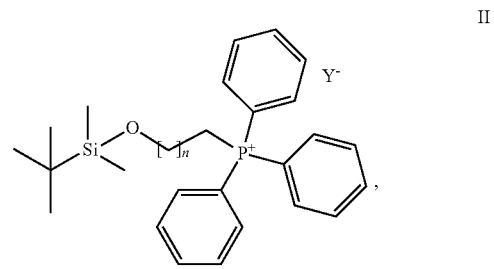

where n=1-19
and Y is I, Br, Cl or mesyl,
under the treatment of an organic base (preferably butyl lithium) in tetrahydrofuran (THF) under an argon atmosphere at the temperature of −78° C. and subsequent condensation with aldehyde of the formula III,

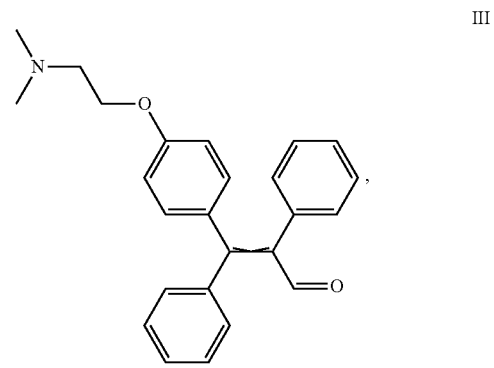 [SMILES: CN(C)CCOc1ccc(C(c2ccccc2)C(C)(C)C(C=O)c2ccccc2)cc1]

affording a silylated derivative of the general formula IV,

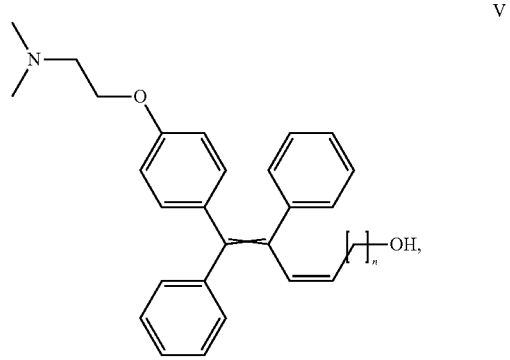

The silylated derivative of the general formula IV is treated with tetrabutylammonium fluoride affording alkenol of the general formula V,

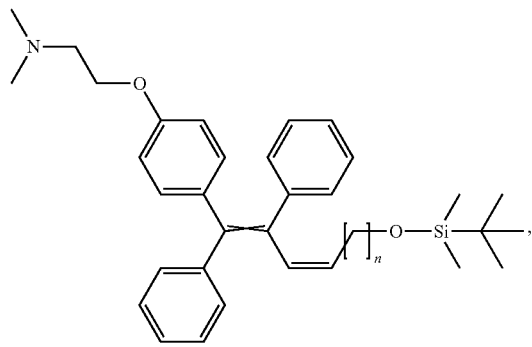

IV which is reduced in the hydrogen atmosphere at the presence of a hydrogenation catalyst to alcohol of the general formula VI,

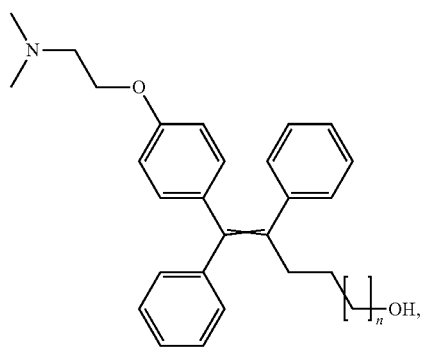

VI the alcohol of the general formula VI is substituted to the corresponding derivative of the general formula VII,

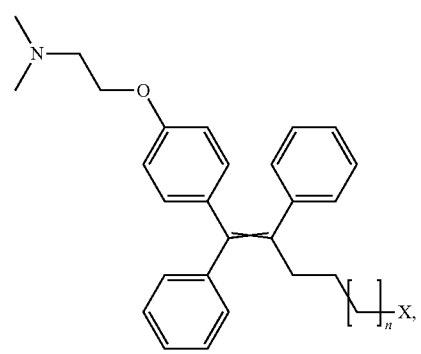

VII which is converted to the phosphonium derivative of 2-(4-(1,2-diphenylvinyl)phenoxy)-N,N-dimethylethan-1-amine (or it's corresponding salt) of the general formula I by heating together with phosphine of general formula VIII,

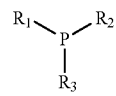

VIII wherein each of R1, R2, R3 has the meaning as defined in formula I.

In one preferred method, the derivative of formula III reacts in one-pot procedure with in-situ prepared ylide derived from reaction of alcohol of general formula IX

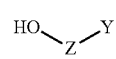

IX wherein Y is a leaving group (or as defined in compound II) and triphenylphosphine in presence of base (preferably lithium bis(trimethylsilyl) amide) in organic solvent (preferably in dimethylformamide/dimethylsulfoxide mixture) to give directly alcohol of general formula V.

In another preferred method, the derivative of formula VII is converted to amine of general formula X under the treatment with ammonia, preferably in DMF/methanol solution,

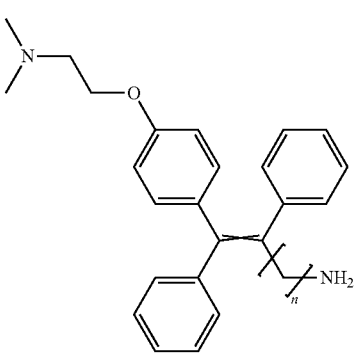

X which reacts with carboxylic acid derivative of general formula XI and phosphine of general formula VIII, preferably in DCM,

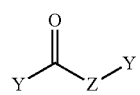

XI to form phosphonium derivative of 2-(4-(1,2-diphenylvinyl)phenoxy)-N,N-dimethylethan-1-amine of the general formula I, wherein Y is a leaving group (or as defined in compound II).

In another preferred method, aldehyde III is converted to alkyn derivative XII using Ohira-Bestmann reagent or other suitable reagent

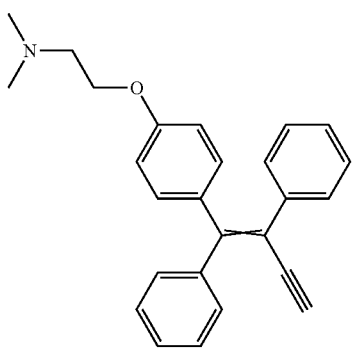

XII and subjected to the reaction with azide derivative of general formula XIII under standard click-reaction conditions, preferably using CuSO$_4$.5H$_2$O and sodium ascorbate, preferably in ethanol/DMF mixture,

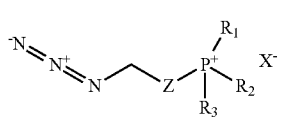

XIII yielding the corresponding derivative of general formula I.

The present invention further provides the compounds of formula I for use in a method of treatment and overcoming the inability of the organism to eliminate senescent cells. The drug affects mainly senescent cells derived from various tissues, particularly breast, pancreatic and prostate tissues.

Thus, compounds of formula I are useful in the treatment and/or prevention of senescence-related diseases and health conditions such as idiopathic pulmonary fibrosis, sarcopenia, diabetes, obesity, osteoarthritis, chronic inflammations, glaucoma, cataracts, radiation-induced oral mucosis, renal transplantation (Munoz-Espin and Serrano, Cellular senescence: from physiology to pathology. Nat Rev Mol Cell Biol. 2014, 15: 482-496) and prostatic hyperplasia (Castro et al., Cellular senescence in the pathogenesis of benign prostatic hyperplasia. Prostate, 55, 30-8. (2003)).

As mentioned above, age-related chronic diseases, such as diabetes, may be caused in part by convergence of the basic aging mechanism that results in age-related tissue dysfunction, chronic "sterile" inflammation, macromolecule damage or progenitor cell dysfunction. Using in vitro and in vivo models, we observed specific elimination of senescent cells using compounds of formula I. We found a key role of the protein adenin nucleotid translocase 2 (ANT2), the upregulation of which increases the resistance of senescent cells to compounds of formula I.

Compounds of formula I induce cell death selectively in senescent cells. They kill very effectively both primary senescent cells accumulated in aging organs and prematurely senescent cells present in younger organisms in response to genetic mutations, environmental influences or, probably most importantly, pathological states.

EXAMPLES OF CARRYING OUT THE INVENTION

Abbreviations

ANT2—adenin nucleotid tranclocase 2
ATP—adenosine triphosphate
B-gal—beta-galactosidase
BrdU—5-bromo-2-deoxyuridine
DCM—dichloromethane
DMF—dimethylformamide
DMSO—dimethyl sulphoxide
FCCP—carbonyl cyanide-4-(trifluoromethoxy) phenylhydrazone
IBX—2-iodoxybenzoic acid
LiHMDS—lithium hexamethyldisilazane
mtATP—mitochondrial adenosine triphosphate
NAC—N-acetylcysteine
NMR—nuclear magnetic resonance
PAI—plasminogen activator inhibitor
qRT PCR—quantitative reverse transcription polymerase chain reaction
ROS—reactive oxygen species
TBAF—tetrabutylammonium fluoride
THF—tetrahydrofuran
TLC—thin layer chromatography Aldehyde of the formula III, which was prepared according to the procedure published in 2003 ((Z)-Tamoxifen and Tetrasubstituted Alkenes and Dienes via a Regio- and Stereospecific Three-Component Magnesium Carbometalation Palladium(0) Cross-Coupling Strategy; Pierre E. Tessier, Andrea J. Penwell, Fabio E. S. Souza, and Alex G. Fallis*; ORGANIC LETTERS, 2003, Vol. 5, No. 17, 2989-2992), was used as the starting material for preparation of (Z)-2-(4-(1,2-diphenylvinyl)phenoxy)-N,N-dimethylethan-1-amine attached to the linker terminated with phosphonium salt of general formula I,

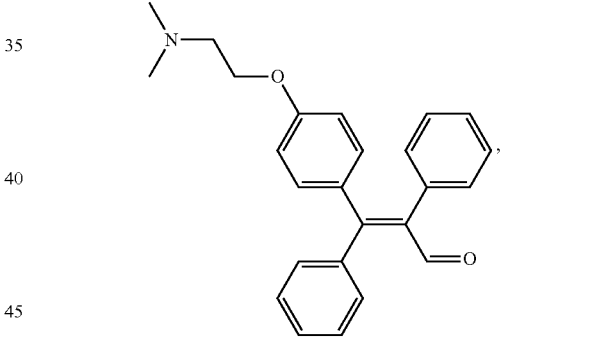

IIIa

The starting aldehyde IIIa can be prepared with the use of another oxidation agent than the one used in the above mentioned publication. Use of stabilized 2-iodobenzoic acid (SIBX) instead of Des s-Martin agent forms only one double bond isomer. The yield is comparable. SIBX (250 g, 401.757 mmol) and the starting allyl alcohol (100.00 g, 267.744 mmol) (see the above mentioned publication) was dissolved in ethyl acetate (1 L). The suspension was refluxed for the time of 1.5 hour under a constant stirring. The reaction mixture was cooled down to the room temperature, filtered and washed between toluene (2.5 L) and sodium hydroxide (2M, 1 L). Organic layer was dried over magnesium sulphate with addition of charcoal (25 g), filtered and concentrated under vacuum to yield 93 g (93%) of aldehyde IIIa in the form of a brownish solid.

Example 1

(9-((tert-butyldimethylsilyl)oxy)nonyl)triphenylphosphonium bromide (634 mg, 1.057 mmol) was dissolved in dry tetrahydrofuran (THF) (6 ml), covered with argon atmosphere and cooled down to −78° C. Butyl lithium (1.2 ml, 0.9 M solution in THF) was slowly added dropwise to the reaction mixture under argon atmosphere. The solution was allowed to warm up to 0° C., colour was changed to dark red, cooled to −78° C. again and aldehyde of the formula Ma (160 mg, 0.430 mmol) dissolved in dry THF (3 ml) was added dropwise. Then the reaction mixture was allowed to warm up to the laboratory temperature and stirred for 16 hours under argon atmosphere. Progress of the reaction was monitored with thin layer chromatography (TLC) in the mixture of chloroform-methanol (10:1). Then saturated solution of ammonium chloride and water was added to the reaction mixture and extracted with ethyl acetate. The ethyl acetate layer was washed with brine and dried over magnesium sulphate. The solution was filtered and concentrated under reduced pressure. Chromatography of the concentrate on the column of silica gel in the system of dichloromethane (DCM)/methanol (gradient 0 to 10% of methanol) yielded 147 mg of product of the formula 4 (56% yield).

4

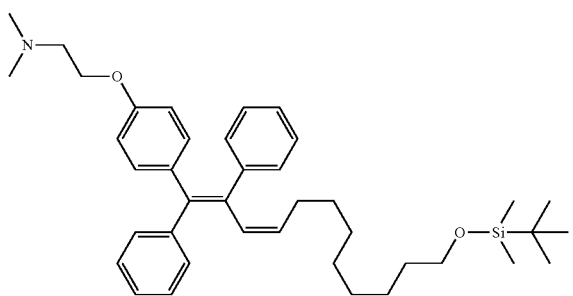

$^1$H NMR (500 MHz, CDCl$_3$) δ 7.42-7.36 (m, 5H), 7.18-7.28 (m, 5H), 6.94 (d, J=8.7, 2H), 6.73 (d, J=8.7, 2H), 6.19 (d, J=11.5, 1H), 5.47 (dt, J=11.5, 7.4, 1H), 4.09 (t, J=5.8, 2H), 3.72 (t, J=6.6, 2H), 2.80 (t, J=5.8, 2H), 2.42 (s, 6H), 1.69-1.57 (m, 4H), 1.48-1.13 (m, 10H), 1.03 (s, 9H), 0.18 (s, 6H). Electrospray ionization mass spectrometry (ESI MS): 612.

$^{13}$C NMR (101 MHz, CDCl$_3$) δ yb 156.64, 143.81, 142.75, 140.29, 138.42, 135.65, 131.80, 129.58, 129.51, 128.04, 127.83, 126.45, 125.94, 113.38, 77.34, 77.02, 76.71, 65.49, 63.34, 58.04, 45.61, 35.88, 32.90, 29.71, 29.65, 29.56, 29.45, 29.41, 29.24, 28.84, 26.00, 25.80, 18.39, −5.23.

HRMS calcd for C40H60O2NSi 614.43878, found 614.43869.

IR (KBr pellet): ν=3056, 3025, 2927, 2855, 2821, 2771, 1943, 1886, 1607, 1508, 1471, 1463, 1443, 1246, 1174, 1098, 1031, 835, 774, 703.

(9-((tert-butyldimethylsilyl)oxy)nonyl)triphenylphosphonium bromide was prepared according to the procedure published in the literature. (Tetrahedron Letters, 2010, 51, 49, 6426-6428.)

Example 2

Method A

Silylated derivative of the formula 4 (147 mg, 2.240 mmol) was dissolved in THF (5 ml), then covered with argon atmosphere and tetrabutylammonium fluoride (TBAF) (260 μl, 1M solution in THF) was added dropwise at a temperature of 0° C. under the stirring. Then the reaction mixture was allowed to warm up to laboratory temperature and stirred for another 6 hours. Progress of the reaction was monitored with TLC in the mixture of chloroform-methanol (10:1). Then water was added and the mixture was extracted with ethyl acetate. The ethyl acetate layer was washed with saturated solution of soda and brine and dried over magnesium sulphate. The desiccant was filtered and the solution was concentrated under reduced pressure. The concentrate was purified with the column chromatography on silica gel in the system chloroform/methanol (gradient 0 to 10% of methanol) to yield 115 mg (96% yield) of the required alkenol of the formula 5.

Method B

Triphenylphosphine (161.5 g, 615.8 mmol) was added to a solution of bromononanol (125 g, 559.8 mmol) in dimethylformamide (500 ml). The reaction mixture was stirred under argon at 80° C. for 16 hours and then cooled to 35° C. Prior addition (10 minute period) of solution of lithium bis(trimethylsilyl) amide in tetrahydrofurane (1M, 1 L) additional solvent (dimethylsulfoxide 1 L and tetrahydrofurane 1 L) was added. After 10 minute of stirring distinctive orange-red color developed upon which a solution of aldehyde Ma (100 g, 269.2 mmol) in tetrahydrofurane (500 ml) was added over 5 minute period. The resulting solution was stirred 1 hour at room temperature. TLC analysis of several drops of reaction mixture washed between ethylacetate and saturated ammonium chloride (developed in chloroform/methanol/ammonia 95:5:0.5) indicated full conversion of starting material. Reaction was quenched with ice (0.5 kg) and ice-cold saturated ammonium chloride solution (1 L). The mixture spontaneously divided in two layers. Bottom aqueous layer was re-extracted with diethylether (1000+500 ml). Combined organic layer was acidified with ethereal HCl (1M, 500 ml) diluted with heptane (1 L) and washed with saturated ammonium chloride (1 L). Brown precipitate of product formed in between of upper organic and bottom aqueous layer. All layers were separated in separatory funnel. Brown oily precipitate was dissolved in dichloromethane and again washed between saturated ammonium chloride (1 L), diethyelter (1 L) and heptane (2 L). Brown precipitate of product which formed in between of upper organic and bottom aqueous was separated in separatory funnel, dissolved in dichloromethane (1 L) and loaded on column (1 L of silica). Chromatography in dichloromethane (2 L)→chloroform/methanol 100:10 (4 L)→100:15 (2 L) afforded light oil of refined product containing significant amount of dimethylsulfoxide. Refined product was than dissolved in methanol (1.5 L) diluted with sodium hydrogen carbonate (4%, 1 L) and extracted to heptane (8×2 L). Combined heptane layer was concentrated under vacuum to give 108.5 g of compound 5 as a white solid.

5

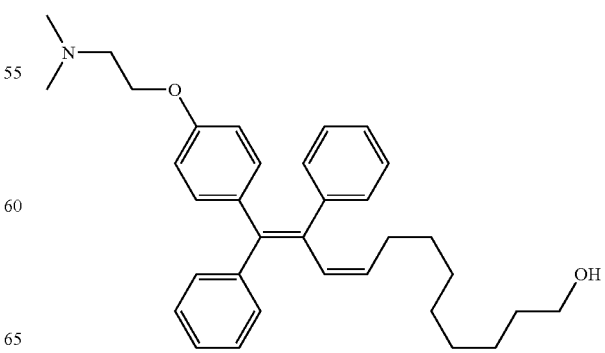

$^1$H NMR (500 MHz, CDCl$_3$) δ 7.43-7.14 (m, 5H), 6.94 (d, J=8.5, 2H), 6.72 (d, J=8.5, 2H), 6.20 (d, J=11.5, 1H), 5.48 (dt, J=11.5, 7.4, 1H), 4.12 (t, J=5.9, 2H), 3.72 (t, J=6.6, 2H), 2.86 (t, J=5.9, 2H), 2.46 (s, 6H), 1.71-1.58 (m, 4H), 1.51-1.10 (m, 10H). ESI MS: 498.

$^{13}$C NMR (101 MHz, CDCl$_3$) δ 157.18, 143.73, 142.70, 141.09, 133.83, 132.52, 131.04, 130.96, 130.65, 127.73, 127.56, 126.84, 126.05, 113.50, 77.38, 77.06, 76.74, 65.71, 62.93, 58.25, 45.86, 32.81, 29.36, 29.32, 29.25, 29.08, 28.96, 25.74.

HRMS calcd for C34H44O2N, 498.33666, found 498.33656.

IR (KBr pellet): ν=3411, 3054, 3019, 2926, 2853, 2772, 1605, 1507, 1464, 1442, 1287, 1243, 1172, 1031, 963, 827, 764.

Example 3

Alkenol derivative of the formula 5 (115 mg, 0.231 mmol) was dissolved in absolute ethanol (6 ml) and covered with argon atmosphere. 10% Pd/C (10 mg) was added to the mixture and the flask with reaction suspension was evacuated and covered with hydrogen atmosphere repeatedly for several times. Then the reaction mixture was stirred at the laboratory temperature under the hydrogen atmosphere for 24 hours. Progress of the reaction was monitored with TLC in the mixture of chloroform-methanol (10:1). The mixture was filtered through a layer of Celite and washed several times with ethanol. Ethanol was evaporated to yield 101 mg (87% yield) of the required alcohol of the formula 6, which is used without any further purification for the next step of the synthesis.

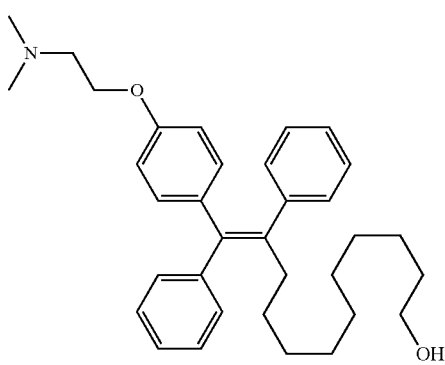

6

$^1$H NMR (500 MHz, CD$_3$OD) δ 7.40-7.01 (m, 10H), 6.85 (d, J=8.1, 2H), 6.68 (d, J=8.1, 2H), 4.20 (s, 2H), 3.55 (t, J=6.4, 2H), 3.46 (s, 2H), 2.89 (s, 6H), 2.42 (t, J=7.8, 2H), 1.57-1.48 (m, 2H), 1.38-1.11 (m, 12H). ESI MS: 500.

$^{13}$C NMR (101 MHz, CDCl$_3$) δ 156.7, 143.8, 142.7, 140.3, 138.4, 135.6, 131.8, 129.6, 129.5, 128.0, 127.8, 126.5, 126.0, 113.4, 77.4, 77.1, 76.7, 65.6, 63.0, 58.1, 45.7, 35.9, 32.8, 29.6, 29.5, 29.4, 29.4, 29.2, 28.8, 25.8.

HRMS calcd for C34H46O2N, 500.35231, found 500.35208.

IR (KBr pellet): ν=3411, 3055, 2925, 2853, 2773, 1607, 1508, 1465, 1442, 1284, 1242, 1174, 1100, 1031, 962, 835, 772, 703, 606.

Example 4

Alcohol of the formula 6 (230 mg, 0,460 mmol) was dissolved in DCM (10 ml). CBr$_4$ (480 mg, 1.447 mmol) was added to the mixture at the laboratory temperature under argon atmosphere. Then triphenylphosphine (400 mg, 1.525 mmol) dissolved in DCM (3 ml) was added dropwise. The mixture was stirred at the laboratory temperature for 2 hours and then concentrated under reduced pressure. Progress of the reaction was monitored with TLC in the mixture of chloroform-methanol (10:1). Chromatography of the concentrate on the column of silica gel in the DCM/methanol system (gradient 0-10%) afforded 273 mg (92% yield) of required bromide of the formula 7. Bromide was subjected to the next reaction without any long storage.

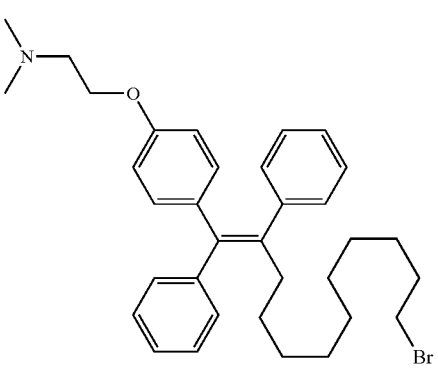

7

$^1$H NMR (400 MHz, CDCl$_3$) δ 7.46-6.96 (m, 10H), 6.78 (d, J=8.9 Hz, 2H), 6.53 (d, J=8.8 Hz, 2H), 4.29 (t, J=6.6 Hz 2H), 3.47-3.28 (m, 4H), 2.82 (s, 6H), 2.38 (t, J=7.8 Hz, 2H), 1.80 (q, J=7.8 Hz, 2H), 1.46-0.98 (m, 14H). ESI MS: 561.

$^{13}$C NMR (101 MHz, CDCl$_3$) δ 155.1, 143.5, 142.5, 140.8, 138.0, 136.9, 132.0, 129.5, 129.5, 128.1, 127.9, 126.6, 126.1, 113.4, 77.4, 77.1, 76.7, 62.6, 56.6, 43.8, 35.9, 34.1, 32.8, 29.6, 29.3, 29.2, 28.8, 28.7, 28.1.

HRMS calcd for C34H45NOBr 562.26790, found 562.26787.

IR (KBr pellet): ν=3417, 3017, 2609, 2456, 1605, 1574, 1508, 1465, 1441, 1284, 1238, 1174, 1111, 1071, 1029, 993, 832, 770, 704, 604.

Example 5

General Procedure:

Phosphine of general structure VIII (3 eq.) was added to bromide of the formula 7 (1 eq.), and the mixture was stirred at the temperature of 85° C. under argon atmosphere for the time of 12 hours. Progress of the reaction was monitored with TLC in the mixture of chloroform-methanol (10:1). The reaction mixture was cooled to the laboratory temperature, dissolved in the minimum quantity of DCM and added dropwise to the hexane solution (50 ml) under a constant stirring at the temperature of 0° C. The formed precipitate was filtered, dissolved in a minimum quantity of DCM again and added dropwise to the diethyl ether solution (50 ml), under a constant stirring at the temperature of 0° C. The precipitate was filtered and dried under vacuum. Yields varied between 55 and 85%.

Example 6

Using procedure described in Example 5 and triphenylphosphine, compound of the formula 8 in the form of yellowish powder was obtained.

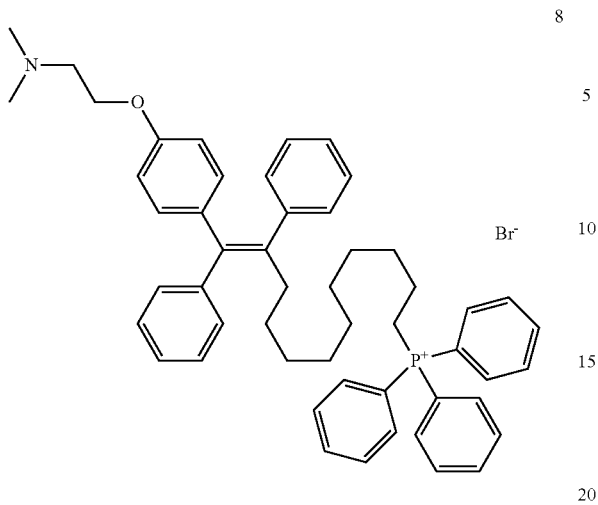

8

¹H NMR (400 MHz, Methanol-d₄) δ 7.98-7.68 (m, 15H), 7.37-7.29 (m, 2H), 7.28-7.05 (m, 8H), 6.82 (d, J=8.8 Hz, 2H), 6.67 (d, J=8.8 Hz, 2H), 4.27-4.07 (t, J=5.2 Hz, 2H), 3.44 (t, J=5.2 Hz, 2H), 3.42-3.34 (m, 2H), 2.87 (s, 6H), 2.38 (t, J=8.0 Hz, 2H), 1.70-1.57 (m, 2H), 1.51 (q, J=7.4 Hz, 2H), 1.43-1.21 (m, 4H), 1.21-1.06 (m, 6H).

¹³C NMR (101 MHz, Methanol-d₄) δ 157.19, 144.91, 143.93, 141.89, 139.94, 137.98, 136.25 (d, J=3.0 Hz), 134.78 (d, J=9.9 Hz), 132.99, 131.51 (d, J=12.6 Hz), 130.72, 130.43, 129.21, 128.93, 127.71, 127.19, 119.97 (d, J=86.2 Hz), 114.65, 63.32, 57.88, 49.64, 49.43, 49.21, 49.00, 48.79, 48.57, 48.36, 44.12, 36.76, 31.50 (d, J=15.9 Hz), 30.55, 30.24, 30.18, 29.74 (d, J=5.4 Hz), 23.50, 23.46, 22.94, 22.43.

HRMS calcd for C52H59NOP 744.43288, found: 744.43311.

IR (KBr pellet): ν=3397, 3051, 3016, 2923, 2853, 2596, 2455, 1605, 1507, 1485, 1465, 1438, 1240, 1174, 1112, 1072, 1028, 995, 751, 723, 705, 691.

Example 7

Using procedure described in Example 5 and tribenzylphosphine, compound of the formula 9 in the form of yellowish foam was obtained.

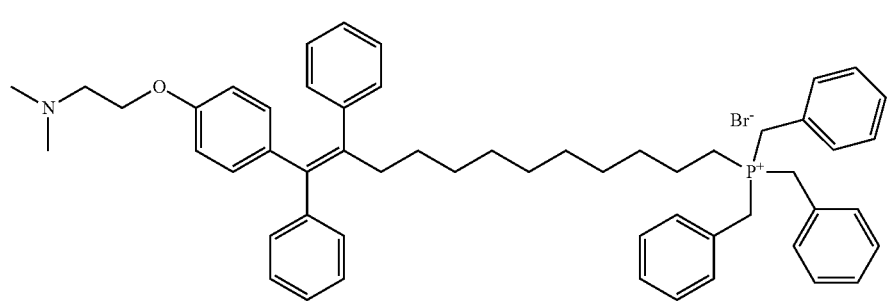

9

¹H NMR (500 MHz, CD₃OD) δ 7.45-7.37 (m, 9H), 7.37-7.31 (m, 2H), 7.30-7.19 (m, 9H), 7.19-7.05 (m, 5H), 6.78 (d, J=8.8 Hz, 2H), 6.58 (d, J=8.9 Hz, 2H), 3.96 (t, J=5.5 Hz, 2H), 3.80 (d, J=14.7 Hz, 6H)—signals of phosphonium methylnes can drift significantly due to solvatation or hydration, 2.69 (t, J=5.5 Hz, 2H), 2.45-2.38 (m, 2H), 2.30 (s, 3H), 2.06-1.96 (m, 2H), 1.42-1.27 (m, 6H), 1.27-1.08 (m, 8H).

¹³C NMR (126 MHz, cd₃od) δ 158.17, 145.09, 144.04, 141.45, 140.17, 136.96, 132.88, 131.44 (d, J=5.2 Hz), 130.76, 130.71 (d, J=3.0 Hz), 130.49, 129.80, 129.77, 129.18, 128.92, 127.66, 127.15, 114.45, 66.38, 59.05, 45.78, 36.76, 31.64 (d, J=15.3 Hz), 30.58, 30.24, 30.11 (2C), 29.76, 29.61, 29.9 (2C), 22.26 (d, J=4.9 Hz).

HR-MS: m/z=393.74333 calcd. for C₅₅H₆₆NOP²⁺ 393.74355.

IR-1602, 1584, 1574, 1508, 1496, 1442, 1174, 1031, 702.

Example 8

Using procedure described in Example 5 and tricyclohexylphosphine, compound of the formula 10 in the form of yellowish foam was obtained.

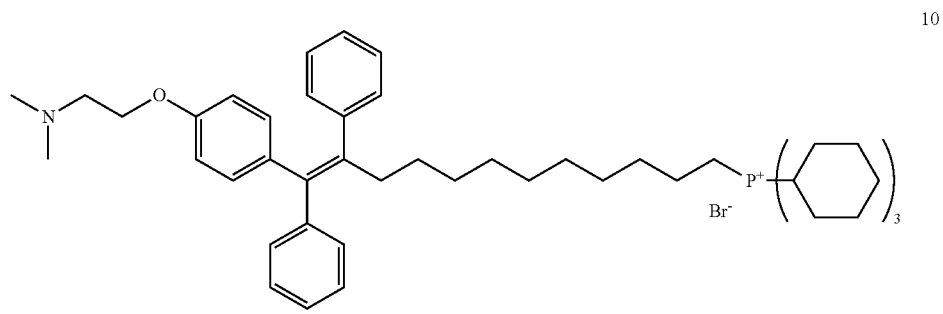

10

¹H NMR (500 MHz, CD₃OD) δ 7.38-7.32 (m, 2H), 7.29-7.24 (m, 1H), 7.23-7.05 (m, 7H), 6.77 (d, J=8.9 Hz, 2H), 6.58 (d, J=8.9 Hz, 2H), 3.96 (t, J=5.5 Hz, 2H), 2.70 (t, J=5.5 Hz, 2H), 2.53 (qt, J=12.5 5 Hz, J=2.5 Hz, 3H), 2.44-2.39 (m, 2H), 2.31 (s, 6H), 2.26-2.18 (m, 2H), 1.96 (m, 12H), 1.80 (m, 3H), 1.66-1.11 (m, 31H).

¹³C NMR (126 MHz, cd₃od) δ 158.14, 145.07, 144.02, 141.45, 140.14, 136.95, 132.86, 130.73, 130.48, 129.15, 128.89, 127.62, 127.12, 114.43, 66.33, 59.03, 45.76, 36.73, 32.14 (d, J=14.0 Hz), 30.80 (d, J=41.2 Hz), 30.60, 30.33, 30.30, 30.25, 29.76, 29.72, 27.98 (d, J=3.8 Hz), 27.50 (d, J=11.9 Hz), 26.55, 26.54, 23.36 (d, J=5.1 Hz), 16.09 (d, J=43.3 Hz).

HR-MS: m/z=2, 381.78974, calcd. for $C_{52}H_{78}NOP^{2+}$: 381.790505; m/z=1, 762.57242, calcd. for $C_{52}H_{77}NOP^{+}$: 762.57373.

IR: 2929, 2853, 2772, 1638, 1606, 1574, 1508, 1492, 1473, 1445, 1443, 1363, 1243, 1174, 1113, 1030, 963, 750, 703.

Example 9

Using procedure described in Example 5 and tris(o-methoxyphenyl)phosphine, compound of the formula 11 in the form of yellowish foam was obtained.

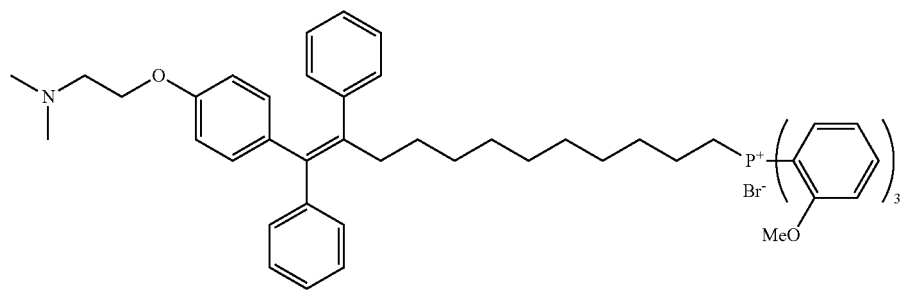

11

$^1$H NMR (500 MHz, CD$_3$OD) δ 7.86-7.78 (m, 3H), 7.37-7.01 (m, 19H), 6.80-6.73 (m, 2H), 6.61-6.55 (m, 2H), 3.97 (t, J=5.5 Hz, 2H), 3.76 (s, 9H), 3.17-3.06 (m, 2H), 2.71 (t, J=5.5 Hz, 2H), 2.42-2.37 (m, 2H), 2.31 (s, 6H), 1.53-1.39 (m, 4H), 1.32-1.27 (m, 2H), 1.25-1.19 (m, 2H), 1.19-1.05 (m, 8H).

$^{13}$C NMR (126 MHz, CD$_3$OD) δ 163.07 (d, J=2.4 Hz), 158.13, 145.08, 144.02, 141.44, 140.14, 138.14 (d, J=2.1 Hz), 136.96, 135.90 (d, J=8.20 Hz), 132.86, 130.74, 130.48, 129.15, 128.90, 127.62, 127.12, 123.12 (d, J=12.7 Hz), 114.44, 113.87 (d, J=6.6 Hz), 107.59 (d, J=92.3 Hz), 66.30, 59.02, 56.62, 45.74, 36.69, 31.61 (d, J=17.6 Hz), 30.50, 30.18 (d, J=3.5 Hz), 30.11, 29.90, 29.67, 25.13 (d, J=54.2 Hz), 25.04, 25.00.

HR-MS: m/z=2, 417.73529, calcd. for $C_{55}H_{66}NO_4P^{2+}$: 417.735952; m/z=1, 834.46307, calcd. for $C_{55}H_{65}NO_4P^{+}$: 834.46457.

IR: 2924, 2853, 2845, 2771, 1640, 1605, 1589, 1575, 1508, 1479, 1432, 1368, 1172, 1030, 962, 757, 703.

Example 10

Using procedure described in Example 5 and methyldiphenylphosphine, compound of the formula 12 in the form of yellowish foam was obtained.

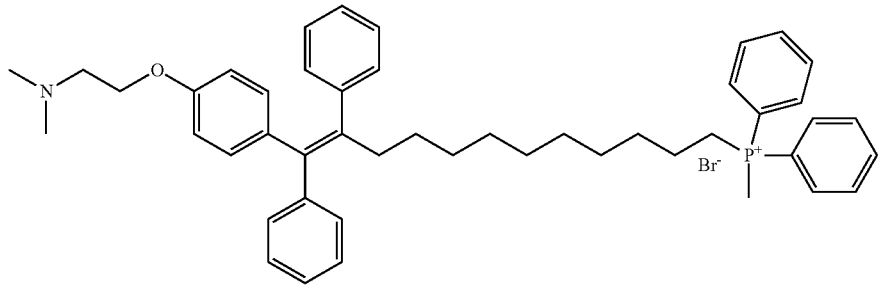

12

$^1$H NMR (500 MHz, CD$_3$OD) δ 7.92-7.78 (m, 6H), 7.76-7.68 (m, 4H), 7.38-7.30 (m, 2H), 7.28-7.04 (m, 8H), 6.77 (d, J=8.8 Hz, 2H), 6.58 (d, J=8.9 Hz, 2H), 3.96 (t, J=5.5 Hz, 2H), 3.01-2.91 (m, 2H), 2.70 (t, J=5.5 Hz, 2H), 2.59 (d, J=13.9 Hz, 3H), 2.42-2.37 (m, 2H), 2.30 (s, 6H), 1.60-1.51 (m, 2H), 1.50-1.43 (m, 2H), 1.34-1.23 (m, 4H), 1.22-1.05 (m, 8H).

$^{13}$C NMR (126 MHz, CD$_3$OD) δ 158.15, 145.07, 144.02, 141.46, 140.14, 136.97, 135.83 (d, J=3.0 Hz), 133.38 (d, J=10.0 Hz), 132.86, 131.28 (d, J=12.5 Hz), 130.74, 130.47, 129.16, 128.90, 127.63, 127.13, 121.42 (d, J=85.6 Hz), 114.44, 66.35, 59.04, 45.77, 36.73, 31.43 (d, J=16.1 Hz), 30.56, 30.27, 30.19 (d, J=2.8 Hz), 29.80, 29.73, 23.09 (d, J=51.5 Hz), 22.84, 22.81, 6.29 (d, J=56.2 Hz).

HR-MS: m/z=2, 341.71149, calcd. for $C_{47}H_{58}NOP^{2+}$: 341.71225; m/z=1, 682.41522, calcd. for $C_{47}H_{57}NOP^{+}$: 682.41723.

IR: 2924, 2853, 2771, 1606, 1589, 1574, 1508, 1491, 1464, 1438, 1369, 1242, 1174, 1116, 1030, 997, 746, 704, 692.

Example 11

Using procedure described in Example 5 and dimethylphenylphosphine, compound of the formula 13 in the form of yellowish foam was obtained.

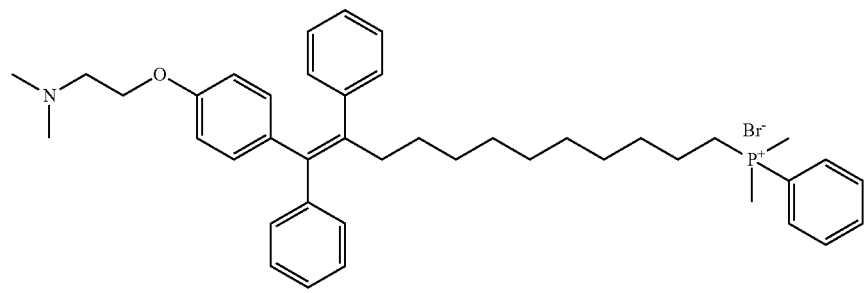

13

¹H NMR (500 MHz, CD₃OD) δ 7.98-7.89 (m, 2H), 7.84-7.76 (m, 1H), 7.74-7.68 (m, 2H), 7.37-7.31 (m, 2H), 7.29-7.05 (m, 8H), 6.77 (d, J=8.8 Hz, 2H), 6.58 (d, J=8.8 Hz, 2H), 3.96 (t, J=5.5 Hz, 2H), 2.69 (t, J=5.5 Hz, 2H), 2.56-2.46 (m, 2H), 2.43-2.36 (m, 2H), 2.29 (s, 6H), 2.23 (d, J=14.3 Hz, 6H), 1.55-1.45 (m, 2H), 1.44-1.35 (m, 2H), 1.34-1.22 (m, 4H), 1.21-1.07 (m, 8H).

¹³C NMR (126 MHz, CD₃OD) δ 158.16, 145.07, 144.02, 141.46, 140.14, 136.96, 135.52 (d, J=3.0 Hz), 132.86, 132.41 (d, J=9.9 Hz), 131.09 (d, J=12.4 Hz), 130.74, 130.47, 129.16, 128.90, 127.63, 127.13, 121.93 (d, J=84.9 Hz), 114.44, 66.39, 59.06, 45.79, 36.73 31.41 (d, J=15.9 Hz), 30.57, 30.30, 30.20 (d, J=3.6 Hz), 29.79, 29.74, 24.61 (d, J=51.6 Hz), 22.57, 22.54, 7.21 (d, J=55.6 Hz).

HR-MS: m/z=2, 310.70419, calcd. for $C_{42}H_{56}NOP^{2+}$: 310.704425; m/z=1, 620.40099, calcd. for $C_{42}H_{55}NOP^{+}$: 620.40158.

IR: 2922, 2852, 2824, 2774, 1636, 1608, 1574, 1508, 1491, 1465, 1452, 1437, 1368, 1247, 1175, 1120, 1028, 964, 744, 690, 480.

Example 12

Using procedure described in Example 5 and tributylphosphine, compound of the formula 14 in the form of yellowish oil was obtained.

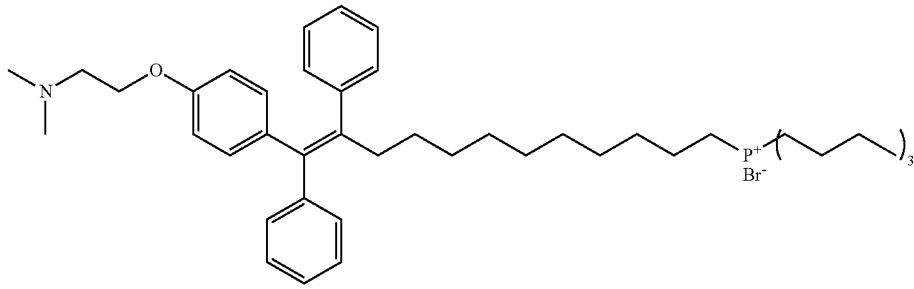

14

¹H NMR (500 MHz, CD₃OD) δ 7.38-7.32 (m, 2H), 7.30-7.06 (m, 8H), 6.77 (d, J=8.9 Hz, 2H), 6.58 (d, J=8.9 Hz, 2H), 3.96 (t, J=5.5 Hz, 2H), 2.69 (t, J=5.5 Hz, 2H), 2.44-2.38 (m, 2H), 2.30 (s, 6H), 2.27-2.15 (m, 8H), 1.63-1.50 (m, 14H), 1.49-1.42 (m, 2H), 1.39-1.12 (m, 12H), 1.01 (t, J=7.1 Hz, 12H).

¹³C NMR (126 MHz, CD₃OD) δ 158.14, 145.07, 144.02, 141.45, 140.14, 136.95, 132.86, 130.74, 130.48, 129.15, 128.90, 127.63, 127.12, 114.43, 66.36, 59.04, 45.77, 36.74, 31.74 (d, J=15.0 Hz), 30.62, 30.37, 30.28 (d, J=6.8 Hz), 29.83, 29.77, 24.95 (d, J=15.6 Hz), 24.39 (d, J=4.6 Hz), 22.34, 22.31, 19.31 (d, J=47.7 Hz), 19.12 (d, J=48.0 Hz), 13.71.

HR-MS: m/z=2, 342.76669, calcd. for $C_{46}H_{72}NOP^{2+}$: 342.76703; m/z=1, 684.52576, calcd. for $C_{46}H_{71}NOP^{+}$: 684.52678.

IR: 2957, 2928, 2858, 2772, 1606, 1574, 1492, 1465, 1410, 1381, 1243, 1174, 1030, 704.

Example 13

Using procedure described in Example 5 and trioctylphosphine, compound of the formula 15 in the form of yellowish oil was obtained.

15

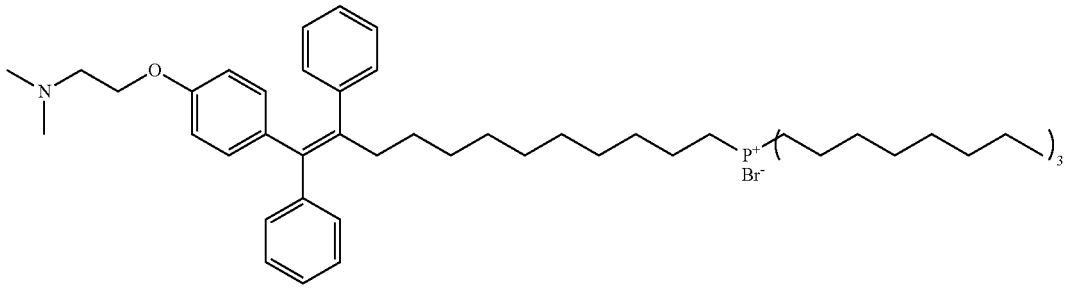

¹H NMR (500 MHz, CD₃OD) δ 7.35 (t, J=7.4 Hz, 2H), 7.29-7.24 (m, 1H), 7.24-7.07 (m, 7H), 6.77 (d, J=8.8 Hz, 2H), 6.58 (d, J=8.8 Hz, 2H), 3.97 (t, J=5.4 Hz, 2H), 2.72 (t, J=5.4 Hz, 2H), 2.46-2.38 (m, 2H), 2.32 (s, 6H), 2.27-2.09 (m, 8H), 1.64-1.54 (m, 6H), 1.53-1.45 (m, 6H), 1.43-1.11 (m, 24H), 0.96-0.87 (m, 9H).

¹³C NMR (126 MHz, CD₃OD) δ 158.11, 145.07, 144.01, 141.45, 140.13, 136.97, 132.87, 130.73, 130.48, 129.15, 128.90, 127.64, 127.13, 114.43, 79.47, 66.25, 59.01, 45.73, 36.75, 32.92, 31.77 (d, J=14.8 Hz), 31.68 (d, J=14.8 Hz), 30.62, 30.39, 30.28, 30.25, 30.13, 29.89, 29.80, 29.78, 23.69, 22.35 (d, J=4.7 Hz), 22.30 (d, J=4.7 Hz), 19.28 (d, J=47.6 Hz), 19.22 (d, J=47.6 Hz), 14.45.

HR-MS: m/z=2, 426.86991, calcd. for $C_{58}H_{96}NOP^{2+}$: 426.86093

IR: 3075(w), 3051(w), 3019(w), 2953(sh) 2924(s), 2868(s), 2854(s), 2802(sh), ~2500(br) NH+, 1605(m), 1575(m), 1508(s), 1490(m), 1466(m), 1442(m), 1410(m), 1378(m), 1241(s), 1175(s), 1030(m), 834(m), 720(sh), 704(s).

Example 14

Using procedure described in Example 5 and trimethylphosphine, compound of the formula 16 in the form of yellowish powder was obtained.

Example 15

Ohira-Bestmann reagent was added into a cold (4° C.) solution/suspension of aldehyde (0.1 g; 0.269 mmol) and K₂CO₃ (0.372 g; 2.694 mmol). The reaction mixture was allowed to room temperature and stirred 1 hour. TLC analysis (chloroform/methanol 10:1) shoved new spot of orange color upon staining with ninhidrine or blue color upon staining with phosphomolybdic acid. Mixture was then filtered, concentrated under vacuum and washed between Et2O (2×30 mL) and water (30 mL). Combined organic layer was dried over MgSO₄ and concentrated under vacuum. Crude product was loaded on column (V(SiO₂)=10 mL) in chloroform/petrolether mixture (1:1). Chromatography (50 mL of chloroform→mL of chloroform/methanol/ammonia 100:1:0.1→50 mL of chloroform/methanol/ammonia 100:2:0.2) afforded 77 mg (76%) compound of the formula 17 in the form of colorless oil.

16

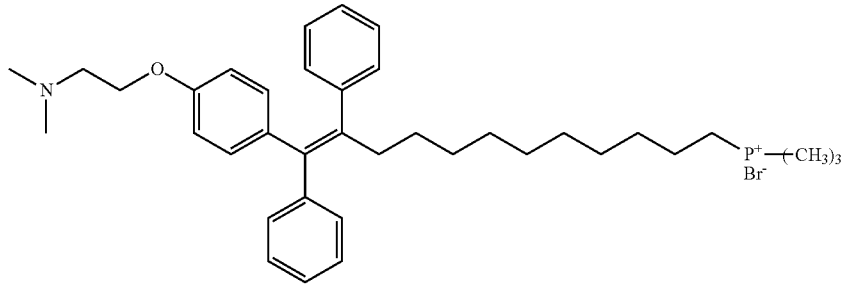

¹H NMR (500 MHz, CD₃OD) δ 7.35 (t, J=7.4 Hz, 2H), 7.29-7.24 (m, 1H), 7.24-7.06 (m, 6H), 6.79 (d, J=8.8 Hz, 2H), 6.60 (d, J=8.8 Hz, 2H), 4.02 (t, J=5.4 Hz, 2H), 2.88 (t, J=5.4 Hz, 2H), 2.44 (s, 6H), 2.43-2.37 (m, 2H), 2.27-2.13 (m, 2H), 1.87 (d, J=14.4 Hz, 9H), 1.67-1.53 (m, 2H), 1.45 (dq, J=8.8, 6.9 Hz, 2H), 1.39-1.10 (m, 12H).

¹³C NMR (126 MHz, CD₃OD) δ 157.90, 145.03, 143.99, 141.58, 140.08, 137.22, 132.89, 130.73, 130.46, 129.17, 128.91, 127.66, 127.14, 114.49, 65.62, 58.75, 45.37, 36.75, 31.74, 31.61, 30.62, 30.41, 30.34, 30.23, 29.93, 29.75, 24.06 (d, J=52.4 Hz), 22.35 (d, J=4.3 Hz), 7.86 (d, J=54.9 Hz).

HR-MS: m/z=2, 276.69702, calcd. for $C_{37}H_{54}NOP^{2+}$: 276.69660.

IR: 3074(w), 3050(w), 3015(w), 2959(sh) 2923(s), 2853(s), 2790(sh), 1605(m), 1594(sh), 1587(m), 1574(m), 1507(s), 1490(sh), 1484(m), 1466(m), 1438(m), 1238(s), 1175(s), 1030(m), 996(m), 723(m), 705(s), 690(m).

17

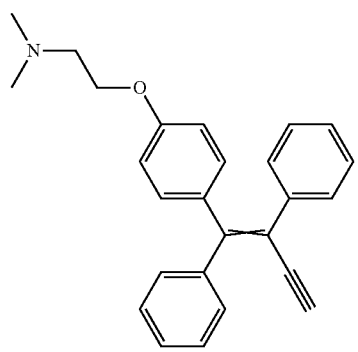

¹H NMR (500 MHz, Chloroform-d) δ 7.52-7.46 (m, 2H), 7.41-7.08 (m, 8H), 6.87 (d, J=8.7 Hz, 2H), 6.67 (d, J=8.7 Hz, 2H), 3.99 (t, J=5.8 Hz, 2H), 2.69 (t, J=5.8 Hz, 2H), 2.32 (s, 6H).

¹³C NMR (126 MHz, Chloroform-d) δ 193.53, 158.14, 150.10, 142.58, 139.55, 133.40, 132.27, 130.28, 129.84, 127.92, 127.70, 126.90, 119.28, 113.75, 85.89, 80.55, 65.83, 58.25, 45.91.

HR-MS: m/z=1, 368.19998, calcd. for $C_{26}H_{26}NO^{1+}$: 368.20089.

Example 16

Sodium azide (231 mg, 0.3556 mmol) was added to a solution of (10-bromodecyl)triphenylphosphonium in dimethylformamide/water mixture (1:1, 1 mL). The mixture was heated to 90° C. overnight. Reaction mixture was then partitioned between dichoromethane (2×15 mL) and water (10 mL). Organic layer was concentrated under vacuum and dissolved in water (10 mL) and diluted with brine (20 mL). Resulting emulsion was extracted with dichloromethane (4×10 mL). Combined organic layer was dried oved MgSO₄ filtered and concentrated under vacuum. Product has essentially the same Rf as starting material (chloroform/methanol 10:1), but differs in color upon staining with pernot. Chromatography (10 ml of silica) in cloroform/methanol 100:0 (100 mL)→100:2 (200 mL)→100:4 (200 mL) afforded 128 mg of compound of the formula 18 as an colorless oil.

Reaction mixture was stirred 1 hour at room temperature upon which orange precipitate formed. TLC analysis (chloroform/methanol/ammonia 100:10:1) after miniwork-up of few drops (dichloromethane/brine wash) indicated complete consumption of starting material and new spot ($R_F$=0.15) of product. Reaction mixture was washed between brine (50 mL) and dichloromethane (3×30 mL). Combined organic layer was dried over MgSO₄ and concentrated under vacuum. Crude product was than loaded to column (V(SiO₂)=10 mL) in mixture (chloroform/methanol/ammonia 100:5:0.5)/petroleether 1:1. Chromatography in 180 mL of (chloroform/methanol/ammonia 100:5:0.5)→200 mL of Chromatography in 180 mL of (chloroform/methanol/ammonia 100:7:0.7) afforded product of the formula 19 (35 mg; 78%) as a yellow oil.

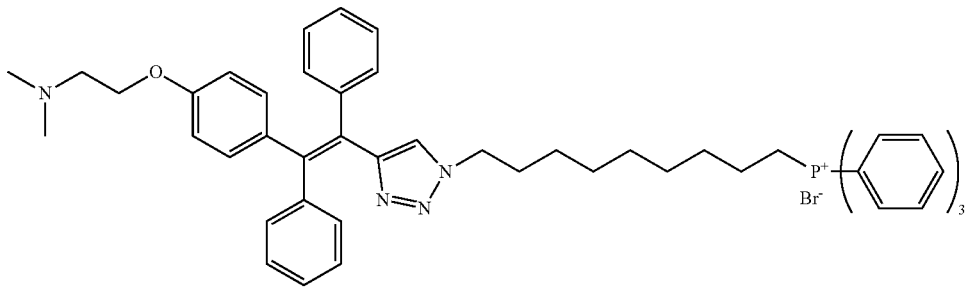

19

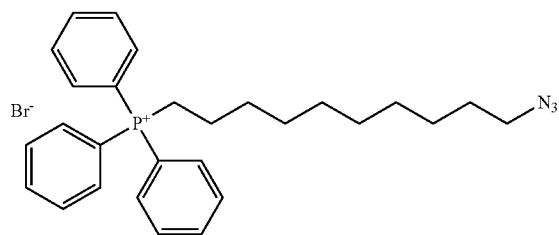

18

¹H NMR (500 MHz, Methanol-d₄) δ 7.91 (td, J=7.3, 1.8 Hz, 3H), 7.86-7.73 (m, 12H), 3.49-3.38 (m, 2H), 3.27 (t, J=6.8 Hz, 2H), 1.76-1.63 (m, 2H), 1.57 (p, J=7.2 Hz, 4H), 1.43-1.22 (m, 10H).

¹³C NMR (126 MHz, Methanol-d₄) δ 136.23 (d, J=3.0 Hz), 134.77 (d, J=10.0 Hz), 131.50 (d, J=12.5 Hz), 119.98 (d, J=86.3 Hz), 52.41, 31.53 (d, J=16.0 Hz), 30.34, 30.21, 30.12, 29.85, 29.81 (d, J=1.3 Hz), 27.73, 23.51 (d, J=4.4 Hz), 22.65 (d, J=50.9 Hz).

Example 18

Alkine of the formula 17 (0.020 g; 0.0544 mmol) and (10-azidodecyl) triphenylphosphonium bromide 18 (0.026 g; 0.0544 mmol) were dissolved in ethanol/DMF (2+1 mL). Reaction vessel was covered with aluminium foil and nitrogen atmosphere was maintained during the course of foloving operations. CuSO₄.5H₂O (40 mg) was added in one portion followed by addition of sodium ascorbate (40 mg).

¹H NMR (500 MHz, CDCl₃) δ 7.90-7.74 (m, 12H), 7.74-7.59 (m, 3H), 7.24-7.00 (m, 10H), 6.87 (d, J=8.6 Hz, 2H), 6.65 (s, 1H), 6.61 (d, J=8.6 Hz, 2H), 4.11 (t, J=6.8 Hz, 2H), 3.98 (t, J=5.6 Hz, 2H), 3.74 (m, 2H), 2.71 (t, J=5.5 Hz, 3H), 2.33 (s, 6H), 2.07-1.97 (m, 2H), 1.71-1.51 (m, 6H), 1.47-0.98 (m, 8H).

¹³C NMR (126 MHz, CDCl₃) δ 157.42, 149.21, 143.85, 142.27, 141.18, 139.17, 134.88 (d, J=2.8 Hz), 133.57 (d, J=10.0 Hz), 132.06, 130.94, 130.38 (d, J=12.5 Hz), 130.27, 129.48, 128.11, 127.76, 126.97, 126.59, 123.71, 118.37 (d, J=85.7 Hz), 113.60, 70.46, 65.62, 58.12, 45.74, 33.72, 31.83, 30.28 (d, J=15.7 Hz), 29.59, 28.86, 28.45, 25.88, 22.59, 22.40 (d, J=54.1 Hz).

IR: 2924, 2853, 2772, 1640, 1605, 1587, 1573, 1507, 1493, 1464, 1438, 1375, 1244, 1172, 1112, 1029, 996, 691.

HR-MS: m/z=2, 406.22778, calcd. for $C_{54}H_{61}NOP^{2+}$: 406.22860.

Example 19

Hydrobromide of bromide intermediate 7 (125 mg, 0.1942 mmol) was dissolved in methanolic ammonia (2 mL, 7N) and DMF (0.5 mL). Reaction mixture was 2 hours heated to 50° C. and additional methanolic ammonia (8 mL, 7N) was added. Mixture was heated overnight, concentrated under vacuum. Chromatography on 12 mL of silica (chloroform→chloroform/methanol/ammonia 100:2:0.2 (50 mL)→100:4:0.4 (150 mL). Afforded 21 mg (22%) of compound of the formula 20 in the form of colorless oil.

20

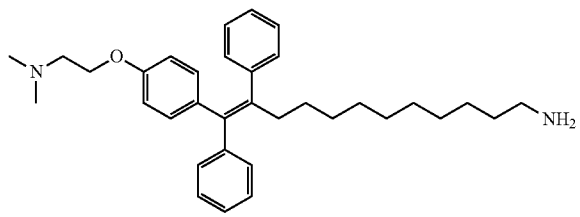

¹H NMR (500 MHz, CD₃OD) δ 7.33 (d, 2H), 7.29-7.24 (m, 1H), 7.23-7.18 (m, 2H), 7.18-7.06 (m, 5H), 6.77 (d, J=8.9 Hz, 1H), 6.57 (d, J=8.9 Hz, 1H), 3.95 (t, J=5.5 Hz, 2H), 2.67 (t, J=5.5 Hz, 2H), 2.63 (t, J=7.4 Hz, 2H), 2.44-2.37 (m, 1H), 2.28 (s, 6H), 1.52-1.40 (m, 2H), 1.38-1.05 (m, 14H).

¹³C NMR (126 MHz, CD₃OD) δ 158.15, 145.08, 144.04, 141.49, 140.12, 136.97, 132.88, 130.75, 130.49, 129.16, 128.90, 127.64, 127.12, 114.43, 66.42, 59.07, 45.82, 42.43, 36.75, 33.44, 30.60, 30.58, 30.53, 30.45, 30.25, 29.74, 27.98.

HR-MS: m/z=2-250.18761, calcd. for $C_{34}H_{48}N_2O$: 250.187785.

Example 20

Amine 20 (50 mg, 0.100 mmol) was dissolved in dry dichloromethane (2 mL) and solution of bromoacetylbromide (20 μl, 0.23 mmol) in dichloromethane (1 mL) was added. TLC (chloroform/methanol/ammonia 100:5:0.5) after 30 minutes of reaction indicated full conversion of starting material to amide. Reaction mixture was diluted with dichloromethane (50 mL) and washed with NaOH (50 mL, 1M). Aqueous layer was reextracted with dichloromethane (30 mL). Combined organic layer was acidified with methanolic HBr (22 μL HBr in 1 mL of methanol) dried over MgSO₄ and concentrated under vacuum. Crude product was dissolved in dimethylformamide (1 mL) and triphenylphosphine (263 mg, 1.00 mmol) was added. Resulting mixture was heated to 50° C. for 1 hour. TLC (chloroform/methanol/ammonia 100:10:1) indicated full conversion of strating material. Mixture was than diluted with diethylether/petrolether mixture (50 mL, 1:1) and precipitated in ice-bath for 2 hours. Solvent was than decanted off and resulting oil was directly loaded onto chromatografic column (10 mL of silica). Chromatography (chloroform/methanol 10:1, 100 mL) afforded 90 mg (93% of product).

¹H NMR (500 MHz, CD₃OD) δ 7.94-7.65 (m, 12H), 7.35 (td, J=7.4, 2.9 Hz, 3H), 7.30-7.01 (m, 10H), 6.84 (d, J=8.5 Hz, 2H), 6.69 (d, J=8.8 Hz, 2H), 4.75 (d, J=14.6 Hz, 2H), 4.22 (t, J=4.9 Hz, 2H), 3.54 (t, J=4.8 Hz, m, 2H), 3.25 (t, J=7.2 Hz, 1H), 3.05 (t, J=7.0 Hz, 1H), 2.94 (s, 6H), 2.43-2.38 (m, 2H), 1.57-1.50 (m, 2H), 1.42-1.25 (m, 6H), 1.23-1.10 (m, 8H).

¹³C NMR (126 MHz, CD₃OD) δ 158.15, 145.08, 144.04, 141.49, 140.12, 136.97, 132.88, 130.62 (d, J=32.5 Hz), 129.03 (d, J=32.6 Hz), 127.38 (d, J=64.7 Hz), 114.43, 66.42, 59.07, 45.82, 42.43, 36.75, 33.44, 30.60, 30.58 (2C), 30.53, 30.45, 30.25, 29.74, 27.98 IR-3377, 2463, 1669, 1605, 1588, 1574, 1543, 1507, 1485, 1438, 1415, 1365, 1240, 1175, 1113, 996, 704, 690.

HR-MS: m/z=2, 401.23091, calcd. for $C_{54}H_{63}N_2O_2P+$: 401.23081.

Example 21

To prove the role of compounds of formula I in elimination of senescent cells also in vivo, we used naturally old FVB mice (19 months) in comparison with young, 2-month old mice. We first analyzed the presence of senescent cells (using B-galactosidase (B-gal) staining) in organs in these two groups. From all tested organs (lungs, brain, white adipose tissue and stomach), we detected the biggest difference in presence of B-gal-positive cells in lungs (not shown). In the next step we treated the mice (6×19 month old mice+6×2 month old mice) with 1 dose of compound 8 (1 μg of compound 8/1 g mouse) every week for a period of 4 weeks. Mice (5×19 month old mice+6×2 month old mice) treated only with a corn oil without compound 8 were used as a control. After 4 weeks we removed lungs and detected percentage of B-gal positive cells in the tissues. Table 1 shows increase of B-gal-positive cells in old mice in comparison with young mice and decrease of their number after compound 8 treatment, which was quantified on ultra-thin sections using specific computer program. This result was supported by data from qRT PCR, where we detected mRNA levels of several other senescent markers such as p16, p21 and plasminogen activator inhibitor (PAI) in lungs, kidney and spleen (Table 2). These data again indicate increase of senescent cells in old mouse tissue and their elimination after compound 8 treatment, since the level of tested markers decreased almost to control levels.

21

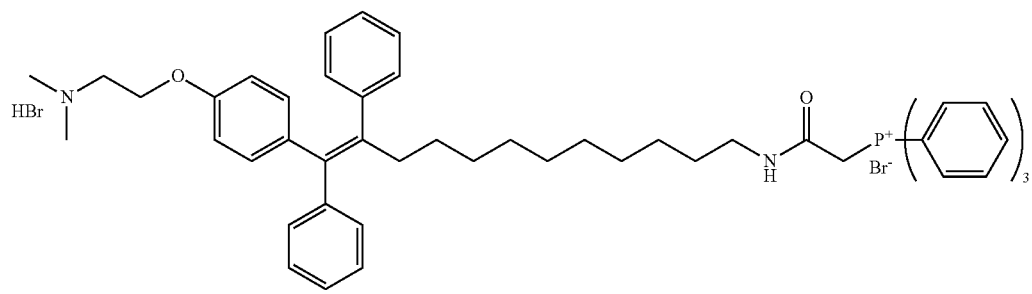

TABLE 1

| sample (compound 8) | % of B-gal positive cells | std. dev. (+/−) |
|---|---|---|
| 2m non-treated | 0.3 | 0.1 |
| 2m treated | 0.3 | 0.0 |
| 19m non-treated | 5.8 | 4.9 |
| 19m treated | 0.7 | 0.6 |

TABLE 2

|  | p16 mRNA fold change | p21 mRNA fold change | PAI mRNA fold change |
|---|---|---|---|
| Lungs (compound 8) | | | |
| 2m non-treated | 0.65 (+/−0.09) | 0.22 (+/−0.03) | 0.78 (+/−0.07) |
| 2m treated | 0.63 (+/−0.07) | 0.30 (+/−0.06) | 0.69 (+/−0.12) |
| 19m non-treated | 0.97 (+/−0.21) | 0.89 (+/−0.33) | 1.20 (+/−0.40) |
| 19m treated | 0.74 (+/−0.12) | 0.39 (+/−0.03) | 0.93 (+/−0.22) |
| Kidney (compound 8) | | | |
| 2m non-treated | 0.02 (+/−0.01) | 0.24 (+/−0.03) | 0.40 (+/−0.14) |
| 2m treated | 0.02 (+/−0.01) | 0.25 (+/−0.05) | 0.47 (+/−0.09) |
| 19m non-treated | 1.40 (+/−0.75) | 0.97 (+/−0.55) | 1.17 (+/−0.71) |
| 19m treated | 0.79 (+/−0.31) | 0.34 (+/−0.11) | 0.79 (+/−0.17) |

Example 22

We tested the effect of compound 8 on cultured senescent pancreatic cells. We used three pancreatic cell lines (PANC-1, PaTu and BxPC-3) exposed to 100 µM BrdU for 6 days to induce senescence. These senescent cells were treated with different doses of compound 8 for 48 h and their viability was assessed. Table 3 shows increased cell death in higher doses of compound 8 (detected as the decreased number of Annexin V/Hoechst-negative cells). RPE cells, as the most sensitive tested cells, were used as a control to establish the concentration at which compound 8 is not toxic for non-senescent cells.

TABLE 3

| | % of AnnexinV-/Hoechst-cells | | | |
|---|---|---|---|---|
| compound 8 | BxPC-3 (senescent) | PANC-1 (senescent) | PaTu (senescent) | RPE (control) |
| 0 µM | 55.8 (+/− 2.33) | 91.4 (+/− 1.41) | 37.8 (+/− 6.50) | 98.4 (+/− 0.57) |
| 0.1 µM | 47.7 (+/− 0.49) | 92.3 (+/− 0.78) | 24.7 (+/−3.25) | 98.9 (+/− 0.14) |
| 0.5 µM | 35.9 (+/− 6.22) | 92.7 (+/− 1.27) | 10.3 (+/−0.97) | 98.8 (+/− 0.21) |
| 1 µM | 4.8 (+/− 0.83) | 5.0 (+/− 1.97) | 3.6 (+/− 3.24) | 98.3 (+/− 0.14) |
| 2.5 µM | 3.9 (+/− 1.69) | 3.1 (+/− 0.68) | 2.4 (+/− 1.21) | 99.1 (+/− 0.35) |

Example 23

Surprisingly, unlike other clinically used chemotherapeutic drugs, compounds of formula I do not induce senescence in tumour cells, which is an important feature of these agents, since this side effect of many established chemotherapeutics considerably complicates treatment outcome. Using Balb-c mice with 4T1 cell-derived tumours or FVB mice with spontaneous tumours treated with compound 8 (0.2 mg of compound 8/mouse, twice per week for a period of 2-3 weeks), we did not observe any increase of senescent markers p16, p21 and PAI on the mRNA level (Table 4).

TABLE 4

| compound 8 | p16 mRNA fold change | p21 mRNA fold change | PAI mRNA fold change |
|---|---|---|---|
| | BALBc/4T1 tumors | | |
| non-treated | 0.51 (+/− 0.34) | 0.94 (+/− 0.15) | 0.71 (+/− 0.20) |
| treated | 0.20 (+/− 0.08) | 0.77 (+/− 0.18) | 0.59 (+/− 0.22) |
| | FVB/cneu tumors | | |
| non-treated | 1.27 (+/− 0.86) | 1.60 (+/− 1.03) | 2.44 (+/− 2.07) |
| treated | 0.39 (+/− 0.24) | 1.94 (+/− 1.43) | 1.93 (+/− 1.19) |

Importantly, we repeated this experiment using patient-derived xenografts (PDXs; triple-negative breast tumour) transplanted into NOD scid gamma mice and treated with compound 8 (0.375 mg of compound 8/mouse, twice per week for a period of 2-3 weeks). Using qRT PCR with specific human primers, we found that even in this case, there was no increase of senescence markers (Table 5).

TABLE 5

| | PDX tumors | |
|---|---|---|
| compound 8 | p16 mRNA fold change | p21 mRNA fold change |
| non-treated | 2.00 (+/− 1.42) | 1.48 (+/− 0.68) |
| treated | 1.34 (+/− 1.25) | 0.72 (+/− 0.84) |

Example 24

Since senescent cells treated with compound 8 are able to induce glycolysis as suggested by their propensity to increase production of lactate, a product of glycolysis (Table 6 for RPE cells), we focused on their ability to use ATP produced by glycolysis. Adenin nucleotid translocase 2 (ANT2) is a protein important for translocation of ATP from cytoplasm to mitochondria unlike two other members of ANT family, ANT1 and ANT3, participating in classical transfer of ADP into mitochondria via complex V during mitochondrial respiration. ANT2 plays a key role in maintenance of mitochondrial potential and in preserving intact mitochondria, especially in tumour cells. Measuring of mRNA level revealed decrease of ANT2 in senescent cells (Table 7 for RPE cells, data for BJ cells not shown). Downregulation of ANT2 in resistant control cells using specific siRNA resulted in increased death of these cells after compound 8 treatment (Table 8 for RPE cells, data for BJ cells are not shown) indicating a role of ANT2 in resistance to compound 8. To prove this hypothesis, we prepared RPE cells transfected with inducible ANT2 in order to increase its levels in senescent cells. Table 9 reveals increased resistance of senescent cells with induced ANT2 towards compound 8 treatment. All these experiments show a key role of ANT2 in compound 8 resistance.

TABLE 6

| sample (compound 8) | Lactate production (fold induction) | std. dev. (+/−) |
| --- | --- | --- |
| RPE ctrl non-treated | 1.0 | 0.00 |
| RPE ctrl treated | 1.6 | 0.03 |
| RPE BrdU non-treated | 2.8 | 0.26 |
| RPE BrdU treated | 8.2 | 0.29 |

TABLE 7

| sample | ANT1 mRNA fold change | ANT2 mRNA fold change | ANT3 mRNA fold change |
| --- | --- | --- | --- |
| RPE ctrl | 1 (+/−0.00) | 1 (+/−0.00) | 1 (+/−0.00) |
| RPE BrdU | 2.1 (+/−0.65) | 0.4 (+/−0.11) | 0.8 (+/−0.14) |

TABLE 8

| sample (compound 8) | % of AnnexinV-/Hoechst-cells | std. dev. (+/−) |
| --- | --- | --- |
| RPE siNC non-treated | 95.8 | 0.06 |
| RPE siNC treated | 90.5 | 5.32 |
| RPE siANT2 non-treated | 89.6 | 2.35 |
| RPE siANT2 treated | 20.7 | 22.06 |

TABLE 9

| sample (compound 8) | % of AnnexinV-/Hoechst-cells | std. dev. (+/−) |
| --- | --- | --- |
| RPE ctrl non-treated | 92.0 | 3.59 |
| RPE ctrl treated | 95.0 | 2.95 |
| RPE ctrl + ANT2 treated | 95.2 | 3.81 |
| RPE BrdU non-treated | 68.8 | 3.85 |
| RPE BrdU treated | 6.8 | 1.76 |
| RPE BrdU + ANT2 treated | 53.8 | 11.66 |

Example 26

The effect of compounds 7, 8, 10, 15 on primary senescent cells (retinal pigment epithelial cells (RPE) treated for 8 days with 100 μM 5-bromo-2-deoxyuridine (BrdU)) was tested. Only compounds of formula I (compounds 8, 10 and 15) showed specific effect on elimination of senescent cells (detected as decrease number of annexin V/Hoechst-negative cells, Table 10) without any effect on control cells. All these experiments were confirmed also for BJ and HPF-1 cells with the same results (data not shown).

TABLE 10

| | % of AnnexinV-/Hoechst-cells | std. dev. (+/−) |
| --- | --- | --- |
| compound 8 | | |
| ctrl 0 μM | 96.1 | 0.1 |
| ctrl 1 μM | 93.0 | 0.4 |
| ctrl 2.5 μM | 90.3 | 1.7 |
| ctrl 5 μM | 3.1 | 0.9 |
| BrdU 0 μM | 66.0 | 0.9 |
| BrdU 1 μM | 67.0 | 0.3 |
| BrdU 2.5 μM | 13.9 | 2.5 |
| BrdU 5 μM | 0.8 | 0.6 |
| compound 7 | | |
| ctrl 0 μM | 95.1 | 3.5 |
| ctrl 0.05 μM | 94.6 | 2.5 |
| ctrl 0.1 μM | 95.1 | 3.0 |
| ctrl 0.5 μM | 91.4 | 9.6 |
| BrdU 0 μM | 79.2 | 4.7 |
| BrdU 0.05 μM | 80.5 | 1.6 |
| BrdU 0.1 μM | 78.3 | 5.6 |
| BrdU 0.5 μM | 55.3 | 16.1 |
| compound 10 | | |
| ctrl 0 μM | 95.1 | 4.2 |
| ctrl 0.05 μM | 96.9 | 2.5 |
| ctrl 0.1 μM | 94.9 | 4.8 |
| ctrl 0.5 μM | 87.3 | 16.2 |
| BrdU 0 μM | 75.2 | 1.8 |
| BrdU 0.05 μM | 79.2 | 0.5 |
| BrdU 0.1 μM | 73.6 | 7.1 |
| BrdU 0.5 μM | 13.6 | 1.7 |
| compound 15 | | |
| ctrl 0 μM | 95.9 | 0.6 |
| ctrl 1 μM | 96.0 | 0.8 |
| ctrl 2.5 μM | 94.7 | 0.4 |
| ctrl 5 μM | 86.2 | 9.8 |
| BrdU 0 μM | 82.0 | 5.4 |
| BrdU 1 μM | 85.9 | 6.5 |
| BrdU 2.5 μM | 76.4 | 6.6 |
| BrdU 5 μM | 21.9 | 3.7 |

The same experiment was repeated with Tamoxifen (known for treatment of senescence from US 2015/0151001) with the following results:

| Tamoxifen | % of AnnexinV-/Hoechst-cells | std. dev. (+/−) |
| --- | --- | --- |
| ctrl 0 μM | 96.2 | 2.8 |
| ctrl 1 μM | 97.0 | 2.1 |
| ctrl 2.5 μM | 96.7 | 2.8 |
| ctrl 5 μM | 94.7 | 1.3 |
| ctrl 10 μM | 55.8 | 1.56 |
| ctrl 20 μM | 2.15 | 1.97 |
| BrdU 0 μM | 75.3 | 0.6 |
| BrdU 1 μM | 73.8 | 2.8 |
| BrdU 2.5 μM | 73.0 | 13.3 |
| BrdU 5 μM | 70.1 | 13.8 |
| BrdU 10 μM | 33.8 | 3.8 |
| BrdU 20 μM | 4.3 | 0.7 |

The results show that the compounds of the present invention are selectively more cytotoxic to senescent cells (compare in particular the viability values for the control and the senescent (BrdU) cells for Compound 8, concentration 2.5 μM, for Compound 7, concentration 0.5 μM; for Compound 10, concentration 0.5 μM; for Compound 15, concentration 5 μM). Tamoxifen, a compound from the prior art, does not at any tested concentration have a significantly higher toxicity for senescent cells than for control cells. Up to the concentration of 5 μM, Tamoxifen does not show cytotoxicity, at 10 μM it decreases the viability of both senescent and control cells by about half, and at 20 μM it is highly cytotoxic to both senescent and control cells. The compounds of the present invention also show significant cytotoxic effect to senescent cells at lower concentrations than Tamoxifen.

The invention claimed is:

1. A compound of general formula Ia or pharmaceutically acceptable salt thereof,

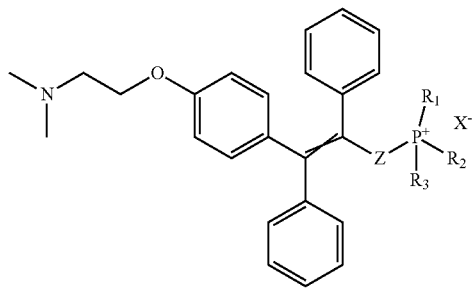

wherein Z is a linear hydrocarbyl chain selected from the group consisting of alkylene, alkenylene and alkynylene having 1 to 20 carbon atoms,
where one or more carbon atom pairs in the linear hydrocarbyl chain may be replaced by one or more 5- or 6-membered aromatic rings or heteroaromatic rings containing one or more heteroatoms selected from O, S and N,
where one or more carbon atoms in the linear hydrocarbyl chain may be replaced by one or more heteroatoms selected from O, S and NH, and
where the linear hydrocarbyl chain can optionally be substituted by one or more substituents selected independently from the group consisting of $C_1$-$C_4$ alkyl, N(H or $C_1$-$C_4$ alkyl)$_2$, phenyl, benzyl, OH, =O, SH, =S, F, Cl, Br, I, $C_1$-$C_4$ alkoxy, $C_1$-$C_4$ acyloxy and $C_1$-$C_4$ mercapto, where alkyl is the same or different;
wherein each of $R_1$, $R_2$ and $R_3$ is independently selected from the group consisting of $C_1$-$C_{10}$ alkyl, $C_6$-$C_{12}$ aryl, $C_6$-$C_{12}$-aryl-$C_1$-$C_2$-alkyl, $C_5$-$C_{12}$ heteroaryl and $C_3$-$C_8$ cycloalkyl,
where each of $R_1$, $R_2$ and $R_3$ can optionally and independently be substituted by one or more substituents selected from the group consisting of $C_1$-$C_4$ alkyl, $C_1$-$C_4$ alkoxy, N(H or $C_1$-$C_4$ alkyl)$_2$, OH, =O, SH, =S, F, Cl, Br, I and $C_1$-$C_4$ mercapto, where alkyl is the same or different, provided that $R_1$, $R_2$ and $R_3$ are not all unsubstituted phenyls;
wherein $X^-$ is a pharmaceutically acceptable anion; and
wherein the crossed double bond in the general formula Ia indicates that the double bond may have E or Z configuration.

2. The compound of claim 1, wherein Z is a linear hydrocarbyl chain selected from the group consisting of alkylene, alkenylene and alkynylene having 4 to 14 carbon atoms, and
where the linear hydrocarbyl chain can optionally be substituted by one or more substituents selected independently from the group consisting of $C_1$-$C_4$ alkyl, N(H or $C_1$-$C_4$ alkyl)$_2$, OH, =O, SH, =S, F, Cl, Br, I, $C_1$-$C_4$ alkoxy and $C_1$-$C_4$ mercapto, where alkyl is the same or different.

3. The compound of claim 1, wherein Z is a linear hydrocarbyl chain selected from the group consisting of alkylene, alkenylene and alkynylene having 4 to 14 carbon atoms,
where one or more carbon atoms in the linear hydrocarbyl chain are replaced by one or more heteroatoms selected from O, S and NH, and
where the linear hydrocarbyl chain can optionally be substituted by one or more substituents selected independently from the group consisting of OH, =O, SH, =S, $C_1$-$C_4$ alkoxy and $C_1$-$C_4$ mercapto.

4. The compound of claim 1, wherein Z is a linear hydrocarbyl chain selected from the group consisting of alkylene, alkenylene and alkynylene having 4 to 14 carbon atoms,
where one or more carbon atoms in the linear hydrocarbyl chain are replaced by NH, and
where the linear hydrocarbyl chain can optionally be substituted by one or more substituents selected independently from the group consisting of OH, =O, SH, =S, $C_1$-$C_4$ alkoxy and $C_1$-$C_4$ mercapto.

5. The compound of claim 1, wherein Z is a linear hydrocarbyl chain selected from the group consisting of alkylene, alkenylene and alkynylene having 4 to 14 carbon atoms,
where one or more carbon atoms in the linear hydrocarbyl chain are replaced by one or more heteroatoms selected from O and S, and
where the linear hydrocarbyl chain can optionally be substituted by one or more substituents selected independently from the group consisting of OH, =O, SH, =S, $C_1$-$C_4$ alkoxy and $C_1$-$C_4$ mercapto.

6. The compound of claim 1, wherein Z is a linear hydrocarbyl chain selected from the group consisting of alkylene, alkenylene and alkynylene having 4 to 14 carbon atoms,
where one or more carbon atom pairs in the hydrocarbyl chain are replaced by one or more groups selected from phenylenes and pyridylenes.

7. The compound of claim 1, where the linear hydrocarbyl chain is substituted by one or more substituents selected independently from the group consisting of $C_1$-$C_4$ alkyl, N(H or $C_1$-$C_4$ alkyl)$_2$, OH, =O, SH, =S, F, Cl, Br, I, $C_1$-$C_4$ alkoxy and $C_1$-$C_4$ mercapto, where alkyl is the same or different.

8. The compound of claim 1, wherein each of $R_1$, $R_2$, $R_3$ is independently selected from the group consisting of $C_1$-$C_8$ alkyl, $C_6$-$C_{12}$ aryl, $C_6$-$C_{12}$-aryl-methyl, and $C_5$-$C_8$ cycloalkyl,
where each of $R_1$, $R_2$ and $R_3$ can optionally and independently be substituted by one or more substituents selected from the group consisting of $C_1$-$C_4$ alkyl, $C_1$-$C_4$ alkoxy, OH, SH, F, Cl, Br, I and $C_1$-$C_4$ mercapto.

9. The compound of claim 1, wherein each of $R_1$, $R_2$, $R_3$ is independently selected from the group consisting of methyl, butyl, octyl, phenyl, methoxyphenyl, benzyl, and cyclohexyl.

10. The compound of claim 1, wherein $X^-$ is selected from the group consisting of citrate, acetate, lactate, tartarate, oxalate, ascorbate, mesylate, tosylate, sulphate, halogenide, phosphate and mixtures thereof.

* * * * *